United States Patent
Kubota et al.

(10) Patent No.: US 6,401,029 B1
(45) Date of Patent: Jun. 4, 2002

(54) ASSIST DEVICE IN DESIGNATION OF DESTINATION

(75) Inventors: Tomoki Kubota; Koji Hori, both of Tokyo-to; Manabu Mazda, Chiba-ken; Kazuhide Adachi, Tokyo-to, all of (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/531,437

(22) Filed: Mar. 20, 2000

(30) Foreign Application Priority Data

Mar. 19, 1999 (JP) .......................................... 11-076792

(51) Int. Cl.⁷ .................................................. G08G 1/00
(52) U.S. Cl. ...................................... 701/201; 701/211
(58) Field of Search ................................ 701/201, 211; 340/995; 345/326, 978, 968, 473

(56) References Cited

U.S. PATENT DOCUMENTS 4,951,212 A * 8/1990 Kurihara et al. ............ 364/449
5,367,454 A * 11/1994 Kawamoto ................ 364/419.2
5,948,040 A * 9/1999 DeLorme et al. ........... 701/201

FOREIGN PATENT DOCUMENTS

JP         11-259446        *  9/1999

* cited by examiner

Primary Examiner—Michael J. Zanelli
(74) Attorney, Agent, or Firm—Lorusso & Loud

(57) ABSTRACT

Disclosed is a device for assisting designation of a specific destination in a vehicle navigation system that guides a driver along a scheduled drive route from a current position of a vehicle to a designated destination. A menu selection table describes correlation between current status data (date-and-time-related data, purpose-related data, location-related data, vehicle-related data and user-related data) and "events" such as invitation to restaurants or sightseeing spots. When a specific event is determined by reference to the menu selection table, a personified agent questions the user to confirm if the detected event is to be executed. When the user inputs an affirmative answer, a specific condition to be applicable to retrieval of destination is determined by reference to a condition selection table.

8 Claims, 15 Drawing Sheets

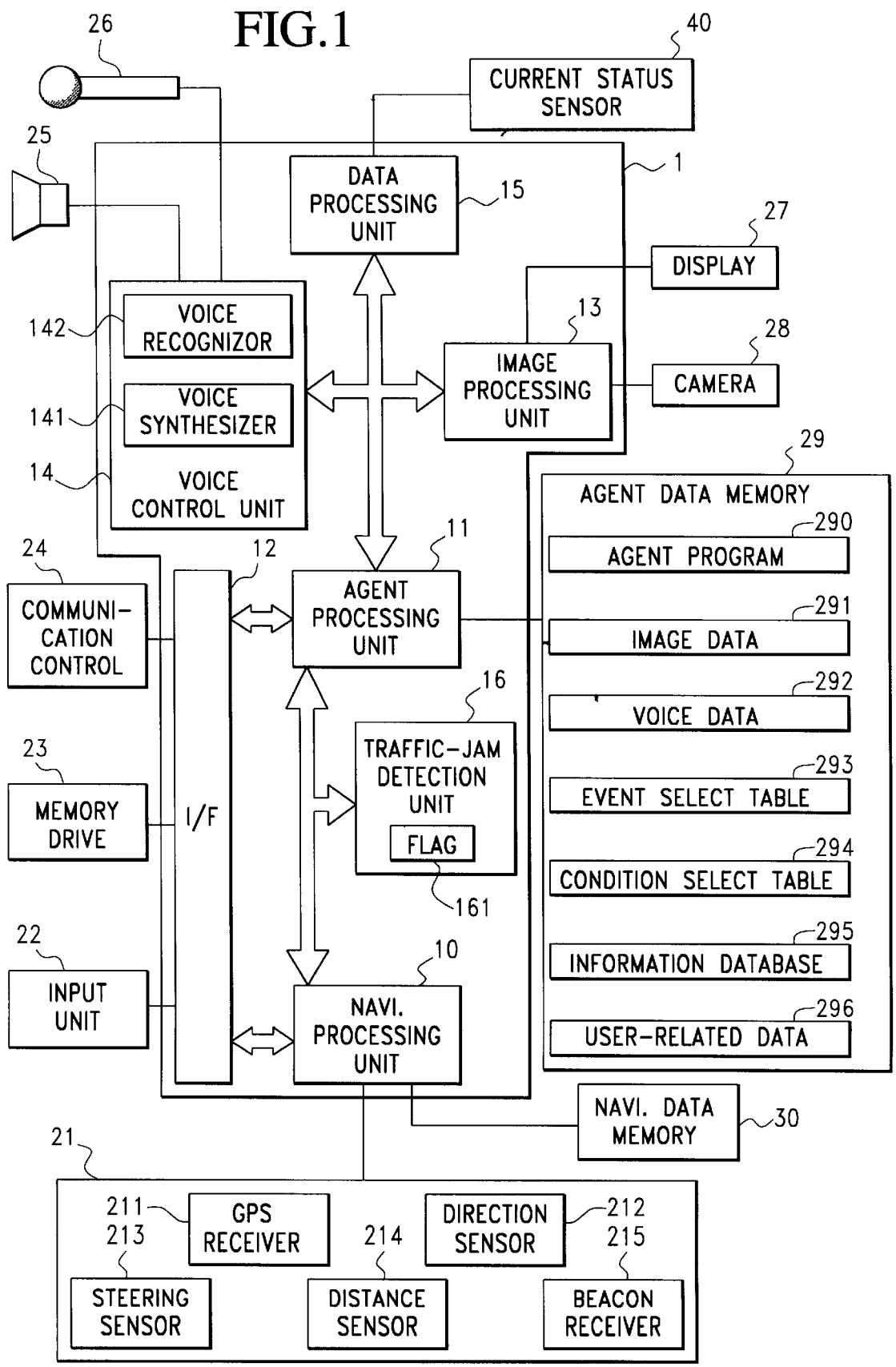

FIG.2A

| No. | DATA GROUP | CURRENT STATUS | CORRESPONDING EVENT |
|---|---|---|---|
| 1 | DAY/TIME | IN MORNING | INVITATION TO BREAKFAST |
| 2 | | IN MIDDAY | INVITATION TO LUNCH |
| 3 | | IN EVENING | INVITATION TO DINNER |
| 4 | | ON THE WAY TO HOME FROM COMPANY | ASKING ABOUT EATING-OUT |
| 5 | | SATURDAY OR SUNDAY | RECOMMENDATION TO EAT-OUT |
| 6 | | DRIVE CONTINUES SO LONG | INVITATION TO TAKE SHORT BREAK |
| 7 | | JUNE | INVITATION TO SUMMER GIFT SALE |
| 8 | | NOVEMBER | INVITATION TO WINTER GIFT SALE |
| 9 | | DECEMBER | INVITATION TO NEW YEAR'S CARDS |
| 10 | | CHRISTMAS COMES SOON | INVITATION TO CHRISTMAS EVENTS |
| 11 | | ST.VALENTINE'S DAY COMES SOON | INVITATION TO GIFT SHOPS |
| 12 | | BIRTHDAY COMES SOON | INVITATION TO GIFT SHOPS |
| 13 | PURPOSE | DATING WITH LOVER | INVITATION TO RESTAURANTS |
| 14 | | DATING WITH LOVER | ASKING ABOUT PICK-UP |
| 15 | | DATING WITH LOVER | INVITATION TO SCENIC SPOTS |
| 16 | | WITH FAMILY | INVITATION TO RESTAURANTS |
| 17 | | WITH FAMILY | PRESENTATION OF AMUSEMENT SPOTS |
| 18 | | WITH GUEST | INVITATION TO RESTAURANTS |
| 19 | | WITH GUEST | ASKING ABOUT PICK-UP |
| 20 | | WITH FRIEND | INVITATION TO RESTAURANTS |
| 21 | | WITH FRIEND | PRESENTATION OF AMUSEMENT SPOTS |
| 22 | | SOLE DRIVE | INVITATION TO RESTAURANTS |
| 23 | | SOLE DRIVE | SPEAKING TO USER |
| 24 | LOCATION | DEST. IS SET | PROPOSAL FOR DRIVE ROUTE WITH MANY RESTAURANTS |
| 25 | | DEST. IS SET WTH FAMILY | PROPOSAL FOR DRIVE ROUTE WITH FAMILY RESTAURANTS |
| 26 | | DEST. IS GOLF COURSE | PROPOSAL FOR DRIVE ROUTE WITH CONVENIENCE STORES |
| 27 | | DEST. IS GOLF COURSE | NON-INVITATION TO RESTAURANTS |
| 28 | | DEST. IS GOLF COURSE | EXPLANATION OF GOLF COURSES |
| 29 | | DEST. IS SKIING GROUND | EXPLANATION OF SKIING GROUNDS |
| 30 | | DEST. IS CAMPSITE | NON-INVITATION TO RESTAURANTS |
| 31 | | DEST. IS SPA | EXPLANATION ABOUT SPA'S EFFECTS |
| 32 | | DEST. IS AIRPORT | NON-INVITATION TO RESTAURANTS |
| 33 | | DEST. IS HARBOR | NON-INVITATION TO RESTAURANTS |
| 34 | | DEST. IS THEATER | NON-INVITATION TO RESTAURANTS |
| 35 | | DEST. IS MOVIE THEATER | NON-INVITATION TO RESTAURANTS |
| 36 | | DEST. IS STADIUM | NON-INVITATION TO RESTAURANTS |
| 37 | | DEST. IS HOSPITAL | NON-INVITATION TO RESTAURANTS |
| 38 | | DEST. IS HOSPITAL | EXPLANATION OF DISEASES |
| 39 | | DEST. IS DRUGSTORE | EXPLANATION OF DISEASES |

FIG.2B

| No. | DATA GROUP | CURRENT STATUS | CORRESPONDING EVENT |
|---|---|---|---|
| 40 | LOCATION | DEST. IS HOTEL | PRESENTATION OF NEARBY SIGHTSEEING SPOTS |
| 41 | | DEST. IS HOTEL | INVITATION TO RESTAURANTS IN HOTEL |
| 42 | | DEST. IS JAPANESE-STYLE HOTEL | PRESENTATION OF NEARBY SIGHTSEEING SPOTS |
| 43 | | DEST. IS JAPANESE-STYLE HOTEL | NON-INVITATION TO RESTAURANTS |
| 44 | | DEST. IS HISTORIC SITE | EXPLANATION OF HISTORY |
| 45 | | DEST. IS WEDDING PARTY HALL | NON-INVITATION TO RESTAURANTS |
| 46 | | DEST. IS TEMPLE | NON-INVITATION TO RESTAURANTS |
| 47 | | DEST. IS SHRINE | NON-INVITATION TO RESTAURANTS |
| 48 | | DEST. IS CHURCH | NON-INVITATION TO RESTAURANTS |
| 49 | | DEST. IS DEPARTMENT STORE | INVITATION TO RESTAURANTS THEREIN |
| 50 | | DEST. IS RESTAURANT | NON-INVITATION TO RESTAURANTS |
| 51 | | DEST. IS FOR SHOPPING | PRESENTATION OF SHOPPING INFORMATION |
| 52 | | DEST. IS COMPANY | NON-INVITATION TO RESTAURANTS |
| 53 | | DEST. IS HOME | ASKING ABOUT EATING-OUT |
| 54 | | DEST. HAS BEEN SET | INVITATION TO RESTAURANTS AROUND DEST. |
| 55 | | DEST. IS DISTANT | SPEAKING TO USER |
| 56 | | DEST. IS DISTANT | INVITATION TO RESTAURANTS |
| 57 | | DEST. IS DISTANT | INVITATION TO TAKE SHORT BREAK |
| 58 | | DEST. IS DISTANT | INVITATION TO SIGHTSEEING SPOTS ON THE WA |
| 59 | | DEST. IS IN SHORT DISTANCE | NON-INVITATION TO RESTAURANTS |
| 60 | | DEST. COMES NEAR | PRESENTATION OF PARKING LOTS |
| 61 | | VEHICLE ENTERS SIGHTSEEING AREA | PRESENTATION OF SIGHTSEEING SPOTS |
| 62 | | VEHICLE ENTERS SIGHTSEEING AREA | PRESENTATION OF LOCAL SPECIALITIES |
| 63 | | ON EXPRESSWAY | INVITATION TO TAKE SHORT BREAK |
| 64 | | ON EXPRESSWAY | PRESENTATION OF SERVICE AREAS |
| 65 | | ON EXPRESSWAY | EXPLANATION OF TALL GATES |
| 66 | | ON NARROW ROAD | ADVICE ABOUT CAREFUL DRIVE |
| 67 | | IN RESIDENTIAL AREA | ADVICE ABOUT CAREFUL DRIVE |
| 68 | | HERE IS REMOTE FROM HOME | PROVIDING AREA INFORMATION |
| 69 | | HERE IS NEAR HOME | NON-INVITATION TO RESTAURANTS |
| 70 | | ARRIVE AT HOME | SAYING "GOOD-BYE" |
| 71 | | ARRIVE AT COMPANY | SAYING "STICK IT !" |
| 72 | | ENTER SNOWY AREA | INVITATION TO ATTACH TIRE-CHAIN |
| 73 | | ENTER ACCIDENT DANGER ZONE | ADVICE ABOUT CAREFUL DRIVE |
| 74 | | APPROACH BRIDGE | ADVICE ABOUT CAREFUL DRIVE |
| 75 | | REMOTE FROM HOME | AGENT APPEARS FREQUENTLY |

FIG.2C

| No. | DATA GROUP | CURRENT STATUS | CORRESPONDING EVENT |
|---|---|---|---|
| 76 | VEHICLE | ENGINE STARTS | SAYING "HELLO !" |
| 77 | | FREQUENT LANE-CHANGE | WARNING |
| 78 | | SPEED OVER | WARNING |
| 79 | | OBEY SPEED LIMIT | SPEAKING WELL OF DRIVE MANNER |
| 80 | | IN TRAFFIC JAM | BY-PASS ROUTE FINDING |
| 81 | | FUEL REMAINDER BECOMES SMALL | INVITATION TO REFUEL |
| 82 | USER | MALE | FEMALE AGENT APPEARS |
| 83 | | FEMALE | MALE AGENT APPEARS |
| 84 | | AGED | AGENT LIKE SECRETARY APPEARS |
| 85 | | YOUNG | FRIENDLY AGENT APPEARS |

FIG.3

RETRIEVAL CONDITION SELECTION TABLES 294

| 3 REST-STOP SELECTION TABLE | | |
| --- | --- | --- |
| 2 SIGHTSEEING-SPOT SELECTION TABLE | | |
| 1 RESTAURANT SELECTION TABLE | | |
| No. DATA GROUP | CURRENT STATUS | CONDITION FOR RETRIEVAL OF DEST. |
| 1  DAY/TIME | SATURDAY OR SUNDAY | EXPENSIVE PRICE |
| 2 | WEEKDAY | USUAL RESTAURANT IS BETTER |
| 3 | LUNCHTIME | BARBECUE IS EXCLUDED |
| 4 | SUMMER | COLD DISH IS BETTER |
| 5 | WINTER | HOT POT DISH IS BETTER |
| 6  PURPOSE | DATING WITH LOVER | FRENCH OR ITALIAN IS BETTER |
| 7 | DATING WITH LOVER | WITH BETTER SCENIC BEAUTY |
| 8 | DATING WITH LOVER | EXPENSIVE PRICE |
| 9 | DATING WITH LOVER | QUIET |
| 10 | DATING WITH LOVER | BARBECUE IS EXCLUDED |
| 11 | DATING WITH LOVER | BIG-NAME IS BETTER |
| 12 | WITH GUEST | JAPANESE FOOD IS BETTER |
| 13 | WITH GUEST | EXPENSIVE PRICE |
| 14 | WITH FAMILY | FRENCH IS EXCLUDED |
| 15 | WITH FAMILY | JOYFUL |
| 16 | WITH FAMILY | STEAK HOUSE IS BETTER |
| 17 | WITH FRIEND | JOYFUL |
| 18 | SOLE DRIVE | FRENCH IS EXCLUDED |
| 19 | SOLE DRIVE | QUIET |
| 20  LOCATION | ROUTE HAS BEEN SET | LOCATED ON THE ROUTE |
| 21 | ROUTE HAS BEEN SET | LOCATED BETWEEN CURRENT POSITION AND DESTINATION |
| 22 | ROUTE HAS BEEN SET | LOCATED AROUND DEST. |
| 23 | HERE IS SEASIDE | SEAFOOD IS BETTER |
| 24 | HERE IS FAR FROM HOME | BIG-NAME IS PREFERRED |
| 25  USER | FEMALE | BARBECUE IS EXCLUDED |
| 26 | AGED | JAPANESE FOOD IS BETTER |
| 27 | YOUNG | WESTERN-STYLE IS BETTER |

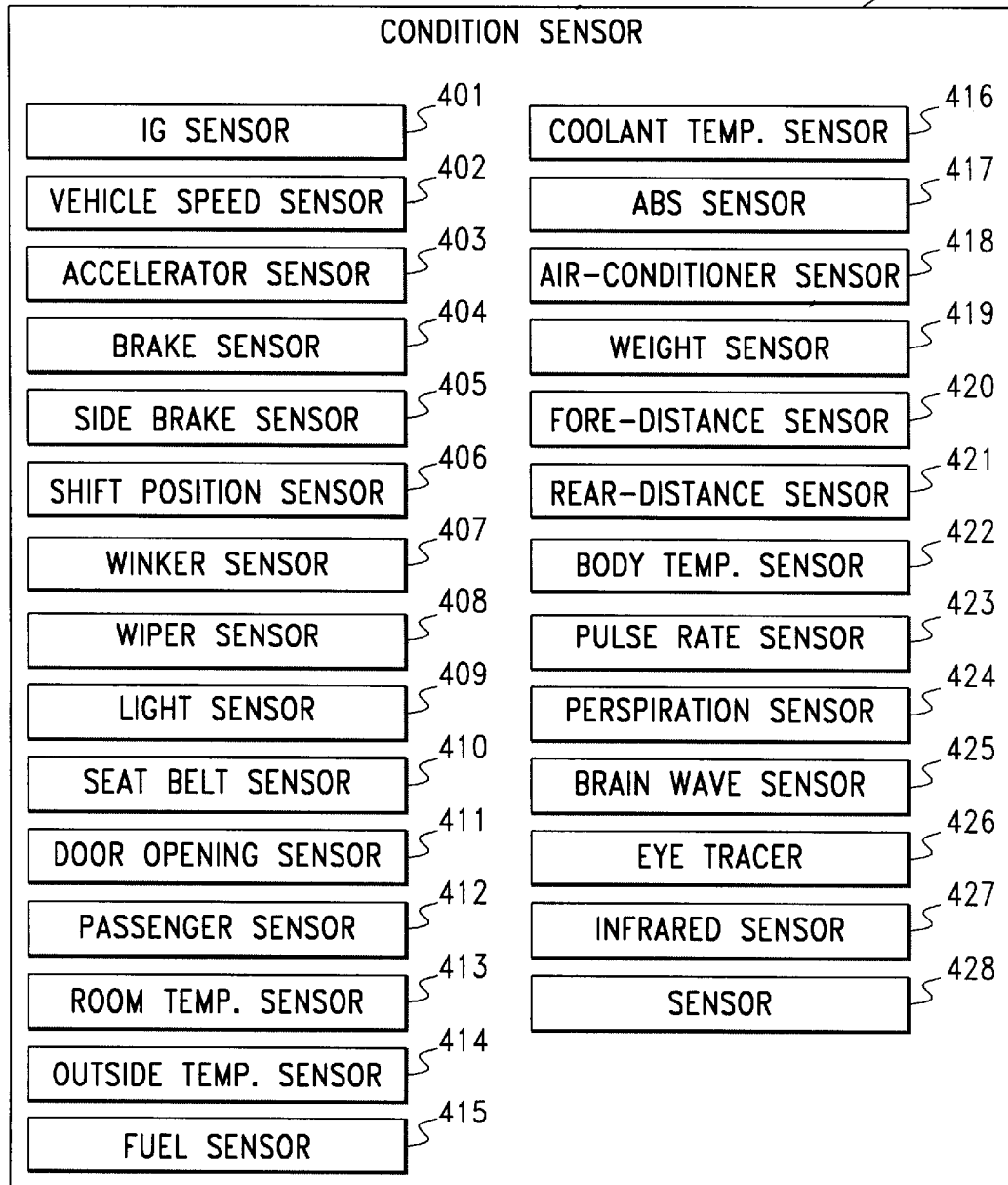

"YOU ENTER KYOTO CITY. MAY I SUGGEST SIGHTSEEING SPOTS IN KYOTO?"

DISPLAY PICTURE FOR INPUT OF USER'S PERSONAL DATA 27a

| | | |
|---|---|---|
| NAME | TARO YAMADA | ~271 |
| AGE | 22 | ~272 |
| SEX | MALE | ~273 |
| BLOOD TYPE | AB | ~274 |
| TASTE & HOBBY | SKIING | ~275 |
| FAVORITE FOOD | STEAK | ~276 |

277 — OK   278 — CANCEL

ASSIST DEVICE IN DESIGNATION OF DESTINATION

TECHNICAL FIELD

This invention relates to a device, particularly mounted in a vehicle, for assisting designation of destination where the vehicle is to go. Specifically, this assist device is incorporated into a navigation system that guides a driver from the current vehicle position to a destination designated by the driver.

BACKGROUND OF THE ART

With recent development and popularization of vehicle navigation systems, some attempts have been made to help the user to designate a destination or goal position where he wants to go. In fact, a great number of places and points that may be designated as a destination are stored as position data in a database. The user chooses and designates one destination, which might involve troublesome operations.

In one of the prior art attempts, some institutions, places and points around the current vehicle position are proposed for destinations that may be designated by the user. For example, a plurality of locations are listed in a display in the order of distance from the current vehicle position. The nearest destination is shown at the top of the display, which may be first recognized and readily chosen by the user.

In another prior art system, a plurality of locations are categorized in advance into several groups, including restaurants, hotels, golf corses, amusement parks, etc. When the user wants to have a lunch or dinner, he specifies a group of "restaurants" through a microphone or operation of any input device. In response to the input of a specific group, the system retrieves, from the database, position data of restaurants within a predetermined distance from the current vehicle position, which are shown on the display in an alphabetical order, for example.

In the prior art systems, a plurality of restaurants are represented on the display in a distance-related or alphabetical order. In retrieving position data from the database, various factors which may vary from user to user, vehicle to vehicle, and case by case are not at all taken into account.

Accordingly, it is an object of the present invention to provide a novel device that assists the user's designation of his desired destination in a vehicle navigation system.

SUMMARY OF THE INVENTION

To achieve the above object, in accordance with the present invention, there is provided a device for assisting designation of a specific destination in a vehicle navigation system that guides a driver along a scheduled drive route from a current position of the vehicle to a designated destination, comprising memory means storing position data for various destinations; sensor means mounted in or on the vehicle; parameter obtaining means for obtaining at least one parameter which is selected from the group consisting of present date and time, purpose of drive, destination that has already been designated, user's sex and user's age; retrieval condition determining means for determining a specific condition to be applicable to retrieval of destinations, with reference to information detected by the sensor means and/or at least one of the parameters obtained by the parameter obtaining means; retrieval executing means for retrieving, from the destinations stored in the memory means, destinations that satisfy the specific retrieval condition(s) determined by the retrieval condition determining means; output means for outputting the retrieved destinations; and selecting means that may be operated by the user to select one of the retrieved destinations.

In a preferred embodiment, the retrieval condition determining means comprises first means that determines if the destination retrieval operation should be executed, with reference to the information detected by the sensor means and/or the present date and time obtained by the parameter obtaining means; and second means that operates when the first means determines that the destination retrieval operation should be executed, for determining the specific retrieval condition, with reference to the information detected by the sensor means and/or at least one of the parameters obtained by the parameter obtaining means.

In another preferred embodiment, the retrieval condition determining means comprises first means for storing retrieval starting conditions for starting the destination retrieval operation; second means for storing correlation between a specific one of the retrieval conditions determined by the retrieval condition determining means and at least one of predetermined day of year, day of month, day of week, time of day, purpose of drive, destination, current position, user's sex and user's age; third means for determining that the destination retrieval operation should be executed, when the at least one of the items of information detected by the sensor means and the present date and time obtained by the parameter obtaining means satisfy the retrieval starting conditions determined by the first means; and fourth means that operates when the third means determines that the destination retrieval operation should be executed, to determine the specific retrieval condition, in reference to the item(s) of information detected by the sensor means and/or at least one of the parameters obtained by the parameter obtaining means.

In still another preferred embodiment, the retrieval condition determining means comprises first means for storing retrieval starting conditions for starting the destination retrieval operation; second means for storing correlation between a specific one of the retrieval conditions determined by the retrieval condition determining means and at least one of predetermined day of year, day of month, day of week, time of day, purpose of drive, destination, current position, user's sex and user's age; third means for outputting a question to the user for confirming that the destination retrieval operation should be executed, when at least one of the items of information detected by the sensor means and the present date and time obtained by the parameter obtaining means satisfy the retrieval starting conditions determined by the first means; fourth means that awaits input, by the user, of a response to the question from the third means; fifth means that operates in response to the input of the user's confirmative response to the question, to determine that the destination retrieval operation should be executed; and sixth means that operates when the fifth means determines that the destination retrieval operation should be executed, to determine the specific retrieval condition, with reference to the item(s) of information detected by the sensor means and/or at least one of the parameters obtained by the parameter obtaining means. In this embodiment, the device may further comprise agent control means for controlling activities of a personified agent. The question outputted by the third means may be a type of activity by the personified agent, which is controlled by the agent control means.

The assist device may further comprise display means on which the scheduled drive route from the current position to the designated destination is shown on a road map.

In accordance with another aspect of the present invention, there is provided a vehicle navigation system comprising a sensor that acquires at least one condition related to a vehicle; means for determining, with reference to the vehicle condition acquired by the sensor, if there is a traffic jam condition on a specific road section; and by-pass route finding means that operates in response to a determination of the traffic jam condition to find a by-pass route from the current position to a pre-designated destination that can by-pass the crowded road section, by reference to at least one of date-and-time related items, today's drive schedule or purpose, locations including the current position and the destination and user-related items.

BRIEF DESCRIPTION OF DRAWINGS

The above and other objects of the present invention will become apparent from the following description when read in conjunction with the accompanying drawings in which:

FIG. 1 is a block diagram showing an agent system in accordance with a first embodiment of the present invention;

FIGS. 2A–2C together are an example of a table providing a correlation between first retrieval parameters or conditions and agent's activities;

FIG. 3 is an example of a table describing second retrieval parameters or conditions and agent's activities;

FIG. 5 shows various sensors in a current status sensor;

DETAILED DESCRIPTION OF EMBODIMENTS OF THE INVENTION

Figure 4:
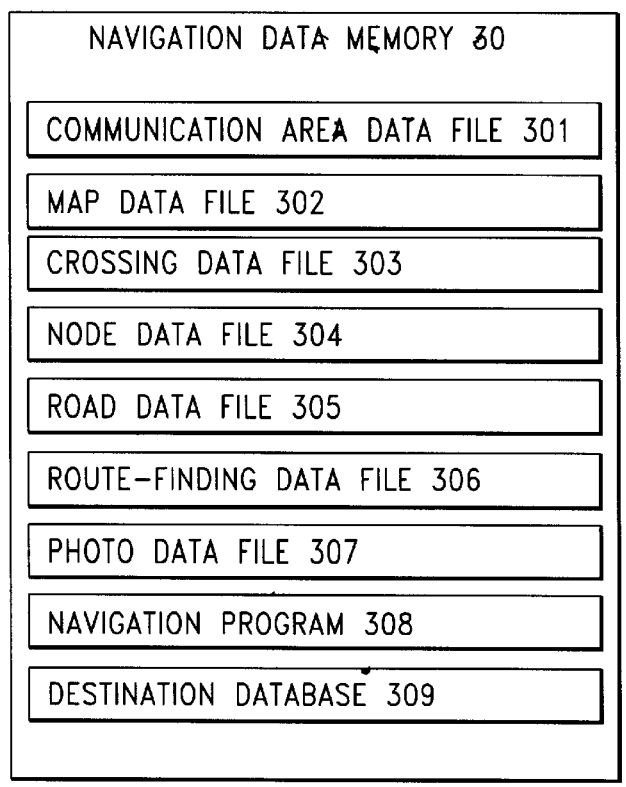
FIG. 4 shows various data files stored in a navigation data memory.

The first embodiment of the present invention will be described hereinbelow with reference to FIGS. 1–22 of the accompanying drawings. In this embodiment, the device of the present invention is incorporated into a system wherein a personified agent appears on a graphic display in a vehicle.

In summary, at least one item of information that relates to date and time (annual day, day of month, day of week, time of day, etc.), purpose of today's drive (date with his lover, shopping with family, etc.), location (vehicle current position, destination, etc.), user (sex, age, etc.), vehicle (ignition-on, temperature, road and other conditions inside or outside of the vehicle, etc.) is detected or obtained. Some information may be detected by one or more of sensors mounted on the vehicle. Other information may be input by the user. The information is applied to a first predetermined correlation table or database to estimate one or more "event" to be provided to the vehicle or user. The term "event" means a communication program using the personified agent. The events typically provide suggestion of sightseeing spots, restaurants, hotels, etc. that may be designated as a destination of the drive from the current position.

When some event is provisionally determined, the agent asks the user to confirm if this event should actually be executed. In response to the user's affirmative answer, this event is actually executed. For example, when the estimated event is to sound out the user about a lunch, this is applied to a second predetermined correlation table or database to determine at least one condition to be applied in retrieval, from a destination database, a limited number of restaurants that would suit the user or meet the today's purpose of drive. The current vehicle position is also taken into account in the retrieval of appropriate restaurants, thereby excluding distant restaurants far from the current position. The retrieved restaurants are shown on a display, one of which may be designated by the user as a destination. Once the destination is specified, the navigation system operates to find a drive route to the destination in a known manner. Of course, there are stored a plurality of second tables for every different group of destinations including restaurants, sightseeing spots, rest stops, hotels, etc.

The agent may be represented as a plane image or three-dimensional image by holography, for example. The activities, including utterance, of the agent are controlled in response to the vehicle condition or other information described above, and the result of past record study. The vehicle conditions may include various conditions of the vehicle itself, the driver, the passenger(s) and preceding and succeeding vehicles. The past record study means a study of a past record of the vehicle condition and may include reaction of the user to the agent's activities appearing on the display. Thus, the driver may communicate with the agent, even while driving.

The agent used herein is an imaginary personified subject who can make a judgement and study in the manner of a human. Accordingly, the same agent makes different communications with the driver corresponding to different vehicle conditions. Even with the same vehicle condition, the past record study may result in different communications by the agent. The agent is not a superhuman and may sometimes make a mis-judgement or blunder as far as it does not adversely affect safety of driving. Any such misjudgement or blunder made by the agent may be corrected in accordance with the driver's reaction, which is a kind of the past record study.

The agent represented on a display may be like a human body. It may also be like an animal such as a chick, dog, cat, frog, rat, etc. It may also be a robot or any character. The agent may be a child at the beginning and grow with time. The appearance and voice of the agent may be selected from predetermined plural options.

It is to be noted that the term "destination", as used throughout the specification and claims, means any place or location where the vehicle is to go from the current position. It is typically the final goal of the drive, but may include any point where the vehicle will stop on the way to the final goal.

FIG. 1 is a block diagram of the agent system of this embodiment of the present invention. There is a total processing unit 1 including a navigation processing unit 10 for finding a drive route to a predetermined destination that is made known to the driver by visual and/or voice message, an agent processing unit 11 for controlling the activities of the agent, an interface (I/F) 12, an image processing unit 13, a voice control unit 14, a current status data processing section 15 and a traffic-jam detecting unit 16.

Traffic-jam detecting unit 16 detects if the vehicle is caught in a traffic jam. It also detects when the traffic jam condition has been eliminated. It stores a traffic-jam indicating flag 161 which indicates a traffic jam condition when ON. The ON or OFF condition of flag 161 may be referred to by navigation processing unit 10 and agent processing unit 11.

Agent processing unit 11 controls the agent's activities which appear on a display 27 in the vehicle interior. As described before, in this embodiment, in response to at least one item of information that relates date and time (day of month, day of week, time of day, etc.), purpose of today's drive (date with his lover, shopping with family, etc.), location (vehicle current position, destination, etc.), user (sex, age, etc.), vehicle condition (ignition-on, temperature, road and other conditions inside or outside of the vehicle, etc.), the agent processing unit 11 determines the event (or agent's activity) to be used in communication with the user and, finally after confirmation by the user, actually executes such event.

More particularly, agent processing unit 11 executes a predetermined program to determine what kind of the event should be produced in a particular instance. The event, thus determined, may be actually executed in accordance with a predetermined execution program. For example, when the determined event is to sound out the user on a lunch, a predetermined "lunch" program is executed. When the determined event is guidance to sightseeing spots, a predetermined "sightseeing" program is executed. When the determined event is to find out a by-pass, a predetermined "by-pass" program is executed. The former two programs may be executed in accordance with the flowchart of FIG. 13, and the latter program may be executed in accordance with the flowchart of FIG. 18, both to be described later in detail.

Navigation processing unit 10, agent processing unit 11 and traffic-jam detecting unit 16 respectively include a central processing unit (CPU) that operates in response to the input information to execute various data processing operations and control of various components. The CPU is connected ROM, RAM and timer through data bus lines. These units 10, 11 and 16 are connected with one another by a network so that data processed in one unit may be given to another unit. For example, navigation processing unit 10 receives detection data from a current position sensor unit 21 to determine a current vehicle position. Unit 10 also determines a drive route from the current position to a destination. Unit 10 also reads out navigation data from a navigation data memory 30. This data is originally obtained by navigation processing unit 10 but may then be received by agent processing unit 11.

ROM is a read-only-memory storing various data and programs necessary for control by the CPU. RAM is a random-access-memory to be used as a working memory when the CPU performs data processing operations.

The CPUs of navigation processing unit 10, agent processing unit 11 and traffic-jam detecting unit 16 read out the programs in ROM to execute the necessary operations. In a modified embodiment, the CPU reads out the programs from a memory medium in a memory drive 23, in which case the programs are then installed in an agent data memory 29, a navigation data memory 30, a hard drive (not shown) or any other memory. A necessary program is retrieved from the memory to RAM for execution. It may be possible that the CPU reads out the necessary program from memory drive 23 to load it directly into RAM.

The navigation processing unit 10 is connected to current position sensor unit 21 and to navigation data memory 30. The agent processing unit 11 is connected to agent data memory 29. Also, navigation data memory 30 is directly or indirectly connected to agent processing unit 11 to retrieve some points and places that may be designated as the destination from data in memory 30 in accordance with the flowchart of FIG. 13, for example.

An input device 22, a memory drive 23, a communication control device 24 and other control devices such as for window control, air-conditioner control, audio volume control, head-lamp control, wiper drive control, etc. are connected to I/F 12. A display 27 and a camera 28 are connected to image processing unit 13. A voice processing unit 14 includes a voice synthesizer 141 to which a voice output device 25 is connected, and a voice recognizor 142 to which a microphone 26 is connected. Current status sensors 40 are connected to current status data processing section 15.

Current position sensor 21 for detecting the current absolute position (its latitude and longitude) of the vehicle has a GPS (global positioning system) receiver 211, a direction sensor 212, a steering sensor 213, a distance sensor 214 and a beacon sensor 215 that receives the position signal from a beacon located on the road. GPS receiver 211 receives radio waves from earth satellites to determine the vehicle position. Beacon sensor 215 receives positional information from beacons arranged on roads. GPS receiver 211 and beacon sensor 215 alone can act to measure the vehicle position. If GPS receiver 211 can not receive the radio waves and beacon sensor 215 can not receive the positional information, direction sensor 212 and distance sensor 214 cooperate with each other to infer the current position. For more precise detection, a differential GPS system may be used.

Direction sensor 212 includes a terrestrial magnetism sensor that detects terrestrial magnetism to determine orientation of the vehicle, a gyromagnetic sensor that detects a rotational angle velocity of the vehicle which is integrated to determine orientation of the vehicle, a pair of wheel sensors that detect an output pulse difference (a difference in movement between left and right wheels) to detect an angle of gyration of the vehicle. Steering sensor 213 employs an optical sensor or rotation resistance volume mounted on a steering member to detect a steering angle. Distance sensor 214 detects a distance of movement by detecting revolution of the wheels or acceleration, for example.

Input device 22 is used to input any data, for example, the current position and the destination, when starting navigation processing. In this embodiment, an input device is also used to input user-related data such as the user's sex, age, taste, character, etc. for use in the event processing routine of FIG. 9, for example. Input device 22 also acts as means for inputting the driver's response to the agent's message or question. An example of input device 22 is a touch panel arranged on display 27 and adapted to input any information by a touch of a key or menu item represented thereon. Other examples of input device 22 are a keyboard, mouse, bar code reader, write pen, joy stick, infrared remote controllable input device and voice analyzer. An infrared remote controllable input device may cooperate with a receiver that receives signals from the input device. The remote controllable input device has a joy stick for moving a cursor on a display, menu designating keys or buttons and ten keys.

Memory drive 23 drives the memory medium storing the computer program that is required to perform operation of navigation processing unit 10 and agent processing unit 11. The computer program stored in the memory medium includes various programs and data. The memory medium may be any one capable of storing the computer program. For example, a magnetic memory medium such as a floppy disk, hard drive or magnetic tape, a semi-conductor memory medium such as a memory chip or IC card, a magneto-optical memory medium such as a CD-ROM, MO or PD, etc., are examples of suitable memory medium. Any printed matter describing the computer program may also used in cooperation with a character analyzer.

When any rewritable memory medium such as a floppy disk or IC card is used, it may also be used to store data in the RAM of navigation processing unit 10 and agent processing unit 11 or memory 29, 30. For example, study data (study item data and response data) regarding activities of the agent is stored in an IC card. The driver may use the IC card storing the driver's own data in common for two or more vehicles, provided these vehicles have the same device. This means that the agent is peculiar not to the vehicle but to the driver.

Communication control device 24 transmits and receives data to and from a portable telephone and permits communication between the driver and someone outside the vehicle. It may also receive Karaoke data. Communication control device 24 also receives data regarding road information including traffic jams. The traffic jam information may be supplied from an ATIS (Advanced Traffic Information Service) center. The traffic jam information may also be obtained by a beacon receiver that receives VICS (Vehicle Information and Communication System) information from beacons arranged along the roads. The study data regarding activities of the agent may be received and transmitted through communication control device 24.

Voice output device 25 comprises a plurality of speakers arranged in the vehicle through which a voice synthesized by voice synthesizer 141 is output. The outputted voice includes a voice message for guidance along the drive route and the agent's voice or sound, that is, the agent's activities. The speakers for audio instruments may be used as voice output device 25. Voice control unit 14 changes accent and tone quality of the voice output by voice output device 25 in response to the driver's tuning command.

A microphone 26 functions as voice input device for inputting any voice which is then processed by voice recognizor 142 of voice control unit 14. For example, a voice for inputting a specific destination of the drive route for navigation processing operation may be inputted through microphone 26. The driver's answer in response to the agent's activities may also be input through microphone 26. A microphone for Karaoke may be used as microphone 26. However, microphone 26 should preferably have sufficient directionality to collect the driver's voice. A hand-free unit comprising speaker 25 and microphone 26 may be used for telecommunication.

Display 27 provides a picture representing the results of execution by navigation processing unit 10, for example, guidance for operation, operation menu, operation keys, a recommended drive route to the goal determined by the user's input through input device 22, and a guide map for the drive route. In this embodiment, one of the important functions of display 27 is to provide a destination list, from which a desired destination may be selected by the user. Display 27 also represents the results of operation by agent processing unit 11, for example, the activities of the agent. Any image taken by camera 28 is also shown on display 27 after being processed by image processing unit 13. Display 27 may be a CRT display, a liquid crystal display, a plasma display or a hologram device that projects a hologram onto a front glass.

Camera 28 comprises CCD cameras that take photographs inside and outside of the vehicle. An inside CCD camera mounted in the vehicle takes photographs of the driver. CCD cameras are also mounted at the front, rear, right side and left side for taking photographs of surroundings of the vehicle. The photographs taken by camera 28 are supplied to image processing unit 13 for image analysis. The result of the image analysis by image processing unit 13 may be used alone or in combination with other data to determine an event number by agent processing unit 11 by reference to an event selection table of FIG. 2.

Agent data memory 29 stores data and programs necessary for agent processing operation in accordance with this embodiment of the present invention. Memory 29 comprises a memory medium such as a floppy disk, hard drive, CD-ROM, magneto-optical disk, magnetic tape, IC card, magneto-optical card, etc. and a drive for the memory medium used.

Agent data memory 29 stores agent program 290, image data 291, sound data 292, event selection table 293, retrieval condition selection tables 294, information database 295 and user-related data 296.

Agent program 290 is prepared for controlling the agent activities. More particularly, the agent's behavior is controlled and defined by agent program 290, which is processed by image processing unit 13 to be shown on display 27 for providing a visual message to the user. The agent's utterance is also controlled and defined by agent program 290, which is processed by voice synthesizer 141 and then output through speakers 25 for communication with the user or urging the user to input an answer through microphone 26.

Agent program 290 stores plural kinds of voice patterns, for example, man's voice, woman's voice, child's voice, mechanical sound, animal voice, famous actor's or actress's voice, and popular character's voice. The user can select a favorite one of the voice patterns stored in agent program 290 through input device 22.

The image data 291 describes faces and figures of the agent which should appear on display 27. As described before, the agent represented on display 27 may be like a human body, like an animal such as a chick, dog, cat, frog, rat, etc., robot or any imaginary character. The agent may be a child at the beginning, and mature with time. The image data 291 includes a plurality of the agent appearances, one of which may be selected by the driver through input device 22.

The sound data 292 comprises a plurality of sound data fragments. Fragments of sound data are read out and combined as required by agent processing unit 11 to formulate an interrogative sentence, which is then synthesized by sound synthesizer 141 and outputted through speakers 25 as a type of agent's activity. For example, the agent says "What will you do today?" to urge the user to input the purpose of today's drive ("date", "family shopping", etc.). In another example, the agent says "You arrive Kyoto city. Will you go sightseeing?" to confirm if a specific event should be executed.

The user may select a desired sound to be heard through speakers 26 as the agent's voice. The agent's voice should preferably be in harmony with the agent's appearance that is also selectable by the user. The agent's voice may be any one of male voice, female voice, child voice, machine voice, animal voice, famous actor's or actress's voice, etc.

The sound data used for drive route guidance ("Turn right at the crossing 100 meters ahead", for example) may be stored in navigation data memory 30. When the drive route guidance is conducted by the agent, such data may also be included in sound data 292.

The information database 296 includes, for example, a Christmas information database, a St. Valentine's Day information database, a restaurant information database, a golf-course information database, a ski slope information database, a spa information database, a sightseeing spot database, a history information database, and a department store database. Information database 296 stores data that has more detailed contents than data stored in destination database 309, to be described later. Various items of information that may change depending upon fashions, vogues and social conditions may be acquired through communication control unit 24 and stored in information database 296. By way of example, when information regarding a special dinner menu that a specific restaurant offers on Christmas Eve and Christmas Day is received through communication control unit 24, it is included in the Christmas information database and in the restaurant information database. When information regarding a weekly bargain sale at a particular department store is received, it may be stored in the department store database.

The user-related data 296 stores personal data including name, address, age, blood type, birthday, sex, character, taste, favorites, religion, height and weight, driver's seat position, mirror angle, eye position, digitalized face picture, voice quality, etc. per user. The user-related data 296 is used to identify the user, and analyze communication between the user and the agent. In this embodiment, some of the user-related information is also used as a condition for determining the event with reference to the event selection table of FIG. 2, as well as a condition for determining the retrieval of destination with reference to the retrieval condition selection table of FIG. 3.

The event selection table 293 lists specific events to be selected in accordance with data or condition concerning present date and time, purpose of drive, location (particularly destination that has already been designated), vehicle, user, etc. An example of the event selection table 293 is shown in FIG. 2. As shown in FIG. 2, various current status data or condition data that determine specific events are categorized into date-and-time-related data, purpose-related data, location-related data, vehicle-related data and user-related data. The date-and-time related data includes annual event data (Christmas day, St. Valentine day, user's birthday, etc.), seasonal data (spring, summer, autumn, winter), month data (January, February, etc.), day of week data (Saturday, Sunday, weekend, etc.), time-related data (morning, afternoon, evening, etc.). The location-related data relates to, for example, destination, destination groups, distance to destination, current vehicle position, sightseeing spots around the destination or current position, road on which the vehicle is running, weather conditions around the destination or current position, etc. The vehicle-related data relates to, for example, ignition-on of the engine, steering operation by the driver, current vehicle speed, traffic-jam on the road, need for replenishing the fuel or other expendable liquids, etc. The purpose-related data relates to the purpose of today's drive, for example, dating with lover, family shopping, sole driving, with friends, with guests, etc. The user-related data may be extracted from the database 296 which may relate to the user's sex and age.

Typical examples of these condition data are specifically described in the event selection table 293 of FIG. 2. In actual application, the event selection table 293 has more detailed description of each condition data. For example, the time-related condition of "in the morning" shown as No. 1 item of the model table of FIG. 2 may be replaced by "it is 5–9 a.m." in the actual table.

The agent processing unit 11 determines if some of the conditions described in the table 293 are satisfied, by reference to the detection signal from current sensor unit 40, current position sensor unit 21, camera 28, input unit 22, microphone 26, communication control unit 24 and traffic-jam detection unit 16. When some condition is found, the agent process ing unit 11 provisionally determines that the corresponding event that is described in the right column in the table 293 should be executed as the agent's activity. By way of example, when it is around seven o'clock in the morning, which is described in the left column of No. I item in the table 293, the corresponding event "invitation to breakfast" in the right column of the same item is selected. Although not specifically described in the model table of FIG. 2, when the user wants to have a list of restaurants around the current position, by his voice command that is input through microphone 26 or by his key operation through input unit 22, agent processing unit 11 receives a command to produce a corresponding event of "presentation of restaurants around the current position".

As described above, the event selection table 293, an example of which is shown in FIG. 2, provides a correlation between a specific condition in the left column and an event corresponding thereto in the right column. The events written in the left column may include active events, passive events and negative events. The active events may be any action, behavior or operation that is given to the vehicle or user. The "invitation to breakfast" is an example of the active events. In the passive events, the agent urges the user to take an appropriate action. The passive events may include "demand for refueling" and "sound-out about periodic inspection". The negative events prohibit specific active events, "non-invitation to breakfast", for example.

When the inputted condition(s) correspond to plural active and/or passive events, these events are successively executed in a predetermined order. When, in turn, the inputted condition(s) correspond to plural events including at least one negative event, the negative event takes the first priority and, therefore, cancels the active and/or passive event that overlaps the contents of the negative event. For example, suppose that the user is to drive with his lover (the purpose of today's drive is a date: items Nos. 13–15 in the table of FIG. 2) to a campsite (that is the destination: item No. 30). Item No. 13 describes the active event "invitation to meal" but item No. 30 describes the negative event "non-invitation to meal". In this case, the negative event of item No. 30 precedes and cancels the active event of item No. 13, and the user is not invited to stop for a meal.

Some of the active events in the right column of the event selection table 293 urge or ask the user to select the destination (see Nos. 15, 16–18, 22–22, for example, in the table of FIG. 2). Although not specifically described in FIG. 2, each of these active events is correlated with one of the retrieval condition selection tables 294. Except for those urging the user to select the destination, each active event is correlated with a specific item of information stored in the information database 296. For example, "invitation to Christmas events" (item No. 10 in the table of FIG. 2) is correlated with various items of Christmas information such as a special dinner menu, for example, that is already stored in the information database 296.

The retrieval condition selection tables 294 comprise a plurality of tables, each describing the conditions for retrieving appropriate destinations, when some active event asking the user to select the destination is determined by reference to the event selection table 293. An example of the tables 294 is shown in FIG. 3. When the event "invitation to meal (breakfast, lunch, dinner)" is determined in the event selection table 293, the restaurant selection table that is shown in FIG. 3 as No. 1 table is applicable. FIG. 3 also shows the sightseeing-spot selection table (No. 2 table) and the rest-stop selection table (No. 3 table). The sightseeing-spot selection table determines a sightseeing spot (described in the right column) which would be appropriate when the vehicle or user satisfies a specific condition (described in the left column). The rest-stop selection table determines a spot (in the right column) which is suggested to the user as a point where the vehicle stops on the way to the final destination, when the vehicle or user satisfies a specific condition (in the left column). Details of the selection table will be described in connection with the restaurant selection table (No. 1 table) because other tables have similar contents and descriptions.

As shown in FIG. 3, various conditions that determine specific events, written in the left column of each table 294, are categorized into date-and-time-related data, purpose-related data, location-related data and user-related data. These condition data have been described in detail in connection with the event selection table 293. When the event "invitation to lunch" is determined by reference to the table 293 of FIG. 2, the restaurant selection table 294 of FIG. 3 determines such retrieval condition that a barbecue restaurant is omitted, as described in item No. 3. This is, of course, an example, and in actual application a greater number of retrieval conditions are given in relation to a specific event. Accordingly, by reference to the retrieval condition selection table 294, restaurants (including fast-food restaurants, tearooms, etc.) that may suit the user's favorite and the current needs, located around the current position or the destination, may be retrieved from the destination database 309 in navigation data memory 30. Likewise, when the event "invitation to sightseeing spots" is selected (in item Nos. 40 and 42 in the table of FIG. 2, for example), recommended sightseeing spots around the current position or the destination may be retrieved from the database 309, by reference to the sightseeing-spot selection table 294 (No. 2 table in FIG. 3).

Each of the retrieval conditions in the left column of the destination selection tables 294 (FIG. 3) also describes a predetermined point for each destination for proposal to the user. This indicates priority of recommendation. When different retrieval conditions designate the same destination, this destination is assigned a total point sum. A destination having a higher point sum is expected to be more appropriate for the user and the current vehicle situation, as compared to other destinations having lower point sums.

FIG. 4 represents data files stored in navigation data memory 30 (FIG. 1). As shown in FIG. 4, navigation data memory 30 stores communication area data file 301, map data file 302, crossing data file 303, node data file 304, road data file 305, route-finding data file 306, photo data file 307, navigation program 308 and destination database 309. Navigation data memory 30 comprises one or a combination of storage media including a floppy disk, hard drive, CD-ROM, magneto-optical disk, magnetic tape, IC card, magneto-optical card, etc., and drive units therefor. For example, route-finding data file 46 is a rewritable memory such as flash memory while other data files are stored in CD-ROM, and drive units therefor are respectively used.

Navigation program 308 includes various programs for determination of destination, drive route planning, guidance to a planned drive route and other navigation operations to be executed by navigation processing unit 10. Agent processing unit 10 may receive any data which has been or is being processed by navigation processing unit 10 in accordance with the navigation program 308. From the data obtained from agent processing unit 10, agent processing unit 11 determines and controls the agent's activity for communication with the user. Thus, the agent may assist at least a part of the navigation operation.

Communication area data file 301 stores communication area data for hand phone types. Communication data is used for representation, on display 27, of communicatable area by the driver's hand phone connected or non-connected to communication control unit 24. This data is also used in finding the drive route to the goal. The respective communication area data is assigned its peculiar number for easy access thereto. The communication area is defined by continuity of short segments, so that the communication area data may be specified by a plurality of coordinate data representing points connecting the segments. In another example, the communication area is divided into plural rectangles, each rectangle being defined by two diagonal points thereof, in which case the communication area data comprises a plurality of coordinate data representing diagonal points of the respective rectangles in the communication area.

Data in communication area data file 301 is preferably renewable to conform with change of the communication area of the phone. To meet this requirement, the hand phone is connected to communication control unit 24 for communication with an information center for updating of the contents of communication area data file 301. In another example, communication area data file 301 is a rewritable and updatable memory such as a floppy disk or IC card.

The map data file 302 stores map data to be represented on display 27. Map data is stored in a tree construction. The uppermost layer is map data of the broadest scale, and the lower layer is detailed map data. The map data of the respective layers are assigned their peculiar map codes.

The crossing data file 303 stores crossing data such as crossing numbers specifying the crossings one by one, crossing names, crossing coordinates, road specifying numbers starting or terminating with the crossings, signals at the crossings, etc.

The node data file 304 stores node data specifying coordinates of respective points on the respective roads. Any road section may be defined by a plurality of node data thereon between the beginning and end of the section.

The road data file 305 stores road numbers specifying the roads one by one, the crossing numbers at the beginning and end of the respective roads, other road numbers of the road that begins or terminates with the same point, road width, prohibition information (no parking, no entrance, one-way road, etc.), number of photo data, etc.

Data stored in the crossing data file 303, the node data file 304 and the road data file 305 are particularly useful for route-finding.

The route-finding data file 306 stores a series of crossing data and a series of node data which constitute the route found in the navigation system. A series of crossing data includes data regarding names and numbers of the crossings on the suggested drive route, numbers of the photos showing these crossings, names and numbers of the crossings at which the vehicle should turn to follow the suggested drive route, distances between the crossings, etc. A series of node data includes data regarding coordinates of the respective nodes on the suggested drive route. The destination that has already been designated by the user is also stored in this file 306.

The photo data file 307 stores photos showing the crossings, conspicuous landscape and buildings, for example, along the suggested drive route. Photos are assigned their particular photo numbers and stored in the form of digital, analog or negative films.

The destination database 309 stores name and coordinates of various points, institutions, facilities, etc. that may be designated as a destination of the drive route. In this embodiment, they are categorized into several destination groups (restaurants, sightseeing spots, rest stops, hotel, etc.) in the database 309. Regarding restaurants and hotels, data in the database 309 includes price, and big-name and formality ranking data. The price, big-name and formality ranking data range from "0" to "3" in this embodiment. For example, Japanese restaurant "Sakura" is stored in the database 309 within its category "Japanese food", price ranking data "2", big-name ranking data "0" and formality ranking data "2". The price, big-name, formality ranking data may have different ranges.

In this embodiment, each destination stored in the database 309 is correlated with a specific purpose (with lover, family, friend, guest, etc.) and a specific age of the user.

As shown in FIG. 5, current status sensor 40 includes an ignition sensor 401, a vehicle speed sensor 402, an accelerator sensor 403, a brake sensor 404, a side brake sensor 405, a shift position sensor 406, a blinker sensor 407, a wiper sensor 408, a light sensor 409, a seat-belt sensor 410, a door opening sensor 411, a passenger sensor 412, a room temperature sensor 413, an open-air temperature sensor 414, a fuel remainder sensor 415, a coolant temperature sensor 416, an ABS sensor 417, an air-conditioner sensor 418, a weight sensor 419, a fore-distance sensor 420, a rear-distance sensor 421, a body temperature sensor 422, a pulse rate sensor 423, a perspiration sensor 424, a brain wave sensor 425, an eye-tracer 426, an infrared sensor 427, and other sensors 428 for detecting, for example, decrease of air pressure of tires, loosening of belts, opening of windows, operation of horn, oil temperature, oil pressure, etc. Current status sensor 40 is used to detect various vehicle conditions and driver's conditions in this embodiment, but may be modified so that only vehicle conditions or only driver's conditions are detected by current status sensor 40. Sensors are mounted at suitable locations inside or outside of the vehicle, respectively. Usually one sensor is used for one sensing purpose. However, it may be possible that some sensor receives the detection signal from another sensor to carry out indirect sensing. For example, an air-pressure sensor may indirectly detect a decrease of an air-pressure of a tire in response to a change of a signal from a wheel velocity sensor.

Ignition sensor 401 detects ON and OFF of an ignition starter. Vehicle speed sensor 402 may be of any conventional type including one wherein a rotation angle velocity or revolution of a speed meter cable is detected to calculate a vehicle speed. Accelerator sensor 403 detects a degree of stroke of an accelerator pedal. A brake sensor 404 detects a stroke, push force or push speed of a brake pedal to determine if the driver intends an emergency braking. Side brake sensor 405 detects operation or non-operation of a side brake. Shift position sensor 406 detects the current position of a transmission shift lever. Blinker sensor 407 detects which blinker is on. Wiper sensor 408 detects wiper drive conditions (especially, wiper speed). Light sensor 409 detects operation of various lights and lamps such as head lights, tail lamps, fog lamps, interior lamps, etc. Seat-belt sensor 410 detects if the driver and passengers are using the seat-belts. If one or more of them is not using a seat-belt, the corresponding communication program has the agent appear on display 27 to give warning, notice, advice, etc., one of which is selected in accordance with the results of study.

Door opening sensor 411 detects opening of vehicle doors. When detecting a half opening of the door, the driver or passenger is informed by the agent's activities (action and voice). Door opening sensor 411 may comprise plural sensors each detecting opening of doors at the driver's seat, at the assistant driver's seat, at opposite rear seats, etc., respectively. Passenger sensor 412 detects if there are any passengers in the vehicle, by the photo showing the interior of the vehicle taken by camera 28 or by pressure sensor or weight sensor mounted under the seat. Temperature sensor 413 detects a passenger compartment temperature of the vehicle, and open air temperature sensor 414 detects a temperature outside of the vehicle.

Fuel remainder sensor 415 detects remainder of fuel in the fuel tank. In a particular embodiment, the communication program is selected when the fuel remainder is decreased to the average of the last five records, so that the agent urges the driver to refuel. Coolant temperature sensor 416 detects coolant temperature. Upon detection that the coolant temperature is lower than a predetermined level at the time immediately after the ignition switch is turned on, the agent usually acts sleepy. On the other hand, when the coolant temperature is higher than another predetermined level, a communication program is selected wherein the agent looks weary and gives warning or notice to the driver to prevent overheating of the engine. ABS sensor 417 detects if an ABS (anti-braking system) is inoperative. As well known, ABS prevents the tires from being locked in emergency braking to thereby improve drivablility and stability of the vehicle. Air-conditioner sensor 418 detects the conditions of an air-conditioner mounted in the vehicle, including ON and OFF thereof, the set temperature and the fan setting, etc. Weight sensor 419 detects the driver's weight, which is used alone or in combination with the photos by camera 28 to identify the driver. When there are different agents selectable by plural drivers, one specific agent is determined by identification of the current driver.

Fore-distance sensor 420 detects a distance to another vehicle or obstacle ahead of the vehicle current position on the road, whereas rear-distance sensor 421 detects a distance to another vehicle or obstacle astern of the vehicle current position on the road. The results of detection by these distance sensors 420, 421 and vehicle speed sensor 402 are supplied to traffic-jam detection unit 16 which determines existence of a traffic jam on the road and if the existing traffic jam has been eliminated. The distance sensors 420, 421 may detect a distance with laser-beam, supersonic, infrared, image processing, vehicle-to-vehicle communication, etc.

Body temperature sensor 422, pulse rate sensor 423 and perspiration sensor 424 detect a body temperature, a pulse rate and perspiration of the driver, respectively. These sensors may be mounted on the surface of a steering wheel to detect conditions of the driver's hand. Body temperature sensor 422 may be a thermograph utilizing infrared sensor elements to detect the driver's body temperature distribution. Brain wave sensor 425 detects alpha wave or beta wave of the driver to determine the degree of awakeness of the driver. Eye-tracer traces eye movement of the driver to determine the driver's intention and awakeness. Infrared sensor 427 detects movement of the user's hands and head.

Among other sensors 428, the slope sensor detects road slope, which may include a first sensor detecting the vehicle orientation in the direction of movement and a second sensor detecting the vehicle orientation in a direction perpendicular to the vehicle movement. The first sensor determines if the vehicle is running uphill, downhill or on a level road, whereas the second sensor detects the bank angle of the road. A wheel speed sensor is mounted at every wheel of the vehicle for separately detecting the wheel rotating speed. A typical example of the wheel speed sensor comprises a toothed rotor rotating with the wheel and an electromagnetic pick-up mounted in a fixed position in opposition to the rotor. The pick-up counts the number of teeth of the rotor, from which the wheel speed is calculated. The wheel speed sensor may be of another type including a reluctance element pick-up. The vehicle speed may be calculated from the detection signal from the wheel speed sensor, in which case the wheel speed sensor functions as the vehicle speed sensor 402 as well.

Figure 6:
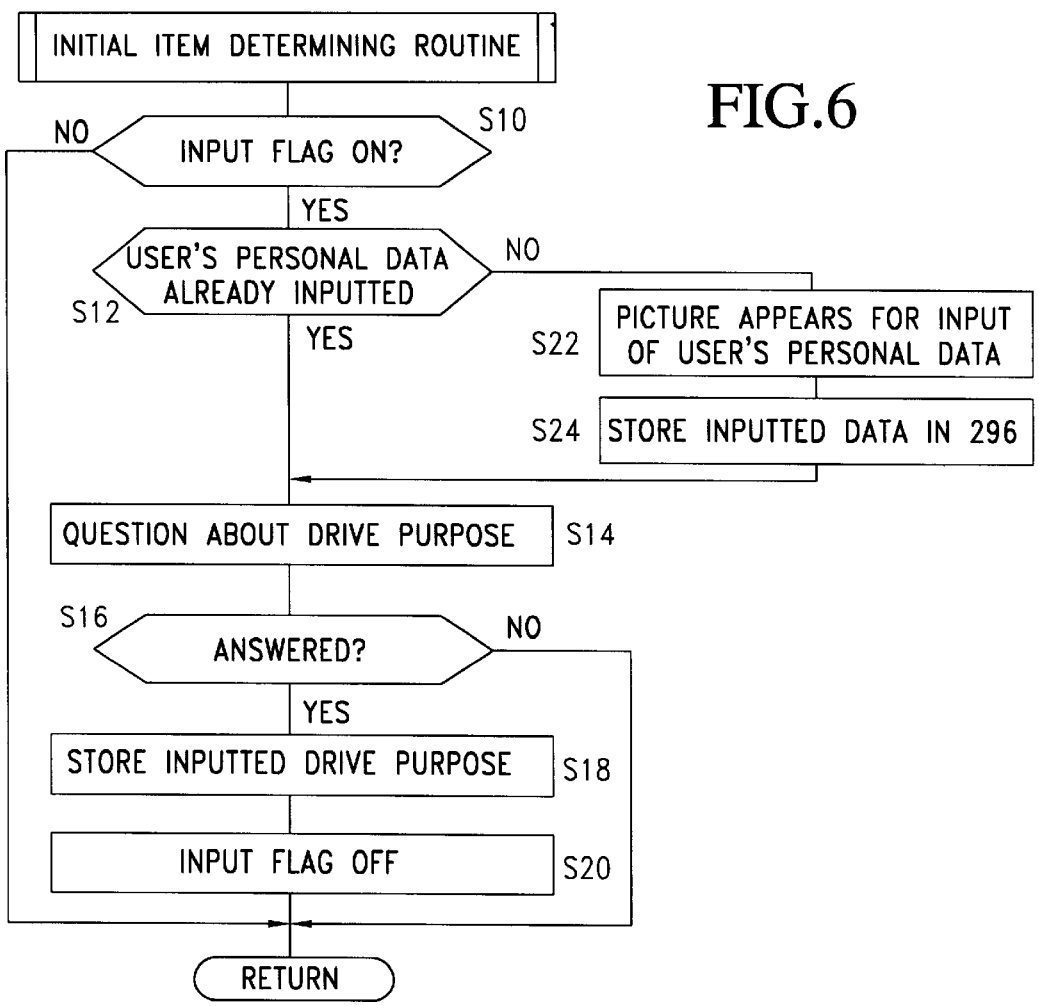
FIG. 6 is a flowchart showing the initial item determining routine.
Figures 7, 8:
FIG. 7 is an example of a display screen by which the user may input the user-related data.
FIG. 8 is an example of the display screen by which the user may input today's drive purpose.

The flowchart of FIG. 6 shows the initial item determining routine to be executed by agent processing unit 11 in this embodiment. It first confirms at S10 if the initial item input flag in the flag area of RAM is ON. If the flag is still OFF (No at S10), meaning that the initial items have already been set, the procedure is returned to the main routine. After confirming the flag is ON (Yes at S10), it then confirms at S12 if the user's personal data has been stored in the database 296. If the user's personal data has not yet been input (No at S12), a display picture such as shown in FIG. 7 appears on display 27 for urging the user to input his or her personal data, at S22. The picture 27*a* of FIG. 7 allows input of the user's name 271, age 272, sex 273, blood type 274, taste or hobby 275 and favorite food 276. These data may be inputted through input unit 22 or microphone 25. When the user's voice is inputted through microphone 25, it is recognized by sound recognizor 142 and the result of recognition is shown in a pertinent column 271–276. The picture 27*a* also includes an OK key 277 and a cancel key 278. The user depresses the OK key 277 when confirming that items shown in the respective columns 271–276 are correct. Depression of the cancel key 278 will cancel the previously inputted data. The user's personal data which has been inputted on the display picture 27*a* and confirmed by depression of the OK key 277 is stored into the database 296, at S24.

After the user's personal data has been stored in the database 296 at S24, or this is confirmed at S12 (Yes at S12), agent processing unit 11 produces a question about the purpose of today's drive to the user, at S14. More particularly, agent processing unit 11 produces a display picture on which the user may input today's drive purpose, an example 27*b* of which is shown in FIG. 8, on which an agent E of a predetermined face and figure appears in accordance with the image data 291. The agent E says something through speakers 25, which is determined also by agent processing unit 11 in accordance with the sound data 292. In the example of FIG. 8, the agent E says "What will you do today", which prompts the user to input the today's purpose. In a preferred embodiment, the agent looks as if she is actually speaking. The whole body of the agent may be shown on the picture 27*b*. Movement (i.e. walking) of the agent may be shown by an animated cartoon or a continuity of still pictures.

As shown in FIG. 8, the picture 27*b* has a menu of the drive purposes, one of which may be selected and inputted by the user. The drive purposes may include dating, with family, with friend, with guest, driving alone, etc. Since only a predetermined number of the drive purposes may be shown on one menu picture, the picture panel may have a menu renewal key, which is depressed so that the next menu picture now appears. Input of the drive purpose may be done in a like manner as for input of the user's personal data, which has been described with reference to the display 27*a* of FIG. 7.

Agent processing unit 11 awaits entry of the drive purpose data at S16. If no entry of the drive purpose data is confirmed within a predetermined period of time (No at S16), the procedure is returned to the main routine. On the contrary, when the drive purpose data has been inputted (Yes at S16), the inputted data is stored into RAM at S18, and the initial item input flag is turned off at S20. Then, the procedure is returned to the main routine.

Figure 9:
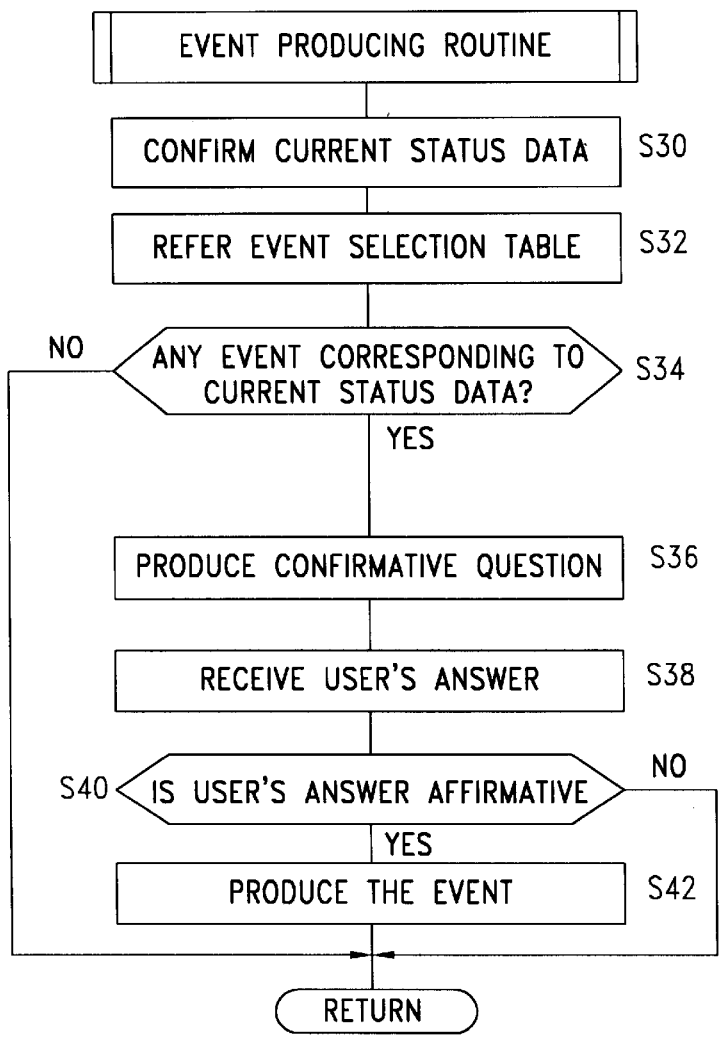
FIG. 9 is a flowchart showing the event producing routine.

After completing the initial item determining routine of FIG. 6, agent processing unit 11 executes the event producing routine, an example of which is shown in FIG. 9. More particularly, agent processing unit 11 first confirms at least one current status data at S30. As described before specifically in reference to FIG. 2, such current status data (or condition data) includes date-and-time-related data (annual event data, seasonal data, monthly data, weekly data, time-of-day related data, etc.), purpose-related data (dating with lover, family shopping, driving alone, with friends, with guests, etc.), location-related data (destination data, current position data, etc.), vehicle-related data (ignition-on data, etc.) and user-related data (user's sex and age, etc.). Agent processing unit 11 acquires the date-and-time related data from a built-in clock (not shown). The location-related data may be the current vehicle position detected by sensor unit 21, and the already-designated destination read out from the data file 306. Data which is obtained by sensor 40, camera 28, input unit 22, microphone 26 or flag 161 in traffic-jam detection unit 16 may be used as the location-related data. Data received through communication control unit 24 may also be used as the location-related data. The user-related data is stored in the database 297. The drive purpose has been inputted at S18 of the flowchart of FIG. 6. The vehicle-related data may be inputted as detection signal from at least one of sensors 401–428 in current status sensor unit 40.

Then, at S32, agent processing unit 11 determines if there is any event corresponding to the current status data confirmed at S32, by reference to the event selection table 293 (FIG. 2). As an example, when it is a midday, an active event of "invitation to lunch" is found by reference to the table of FIG. 2 (as described in item No. 2). When there is some sightseeing spot around the current vehicle position detected by sensor 21, two active events "presentation of sightseeing spots" (item No. 61) and "presentation of local specialities" (item No. 62) are confirmed. When the destination stored in the data file 306 is a Japanese-style hotel usually with meals (dinner and breakfast), an active event of "presentation of sightseeing spots" (item No. 42) and a negative event of "non-invitation to dinner" (item No. 43) are found. When the user has been driving the vehicle over a predetermined long period of time, the active event of "invitation to rest stop" may be described in the table 293, as shown as No. 6 item in the table of FIG. 2.

Events may be described in the table 293 in relation to the information inputted through input unit 22 or microphone 26. For example, when the user depresses the key on the display panel 27 to request presentation of restaurants around here, or when the user so speaks through microphone 26, agent processing unit 11 determines an active event of "representation of nearby restaurants", though not specifically described in the table of FIG. 2. When the vehicle approaches a snowy district, an active event of "invitation to attachment of tire chains" is found (item No. 72). When the flag 161 is ON indicating that there is a traffic jam, the active event of "by-pass route suggestion" is confirmed (item No. 80).

Figure 10:
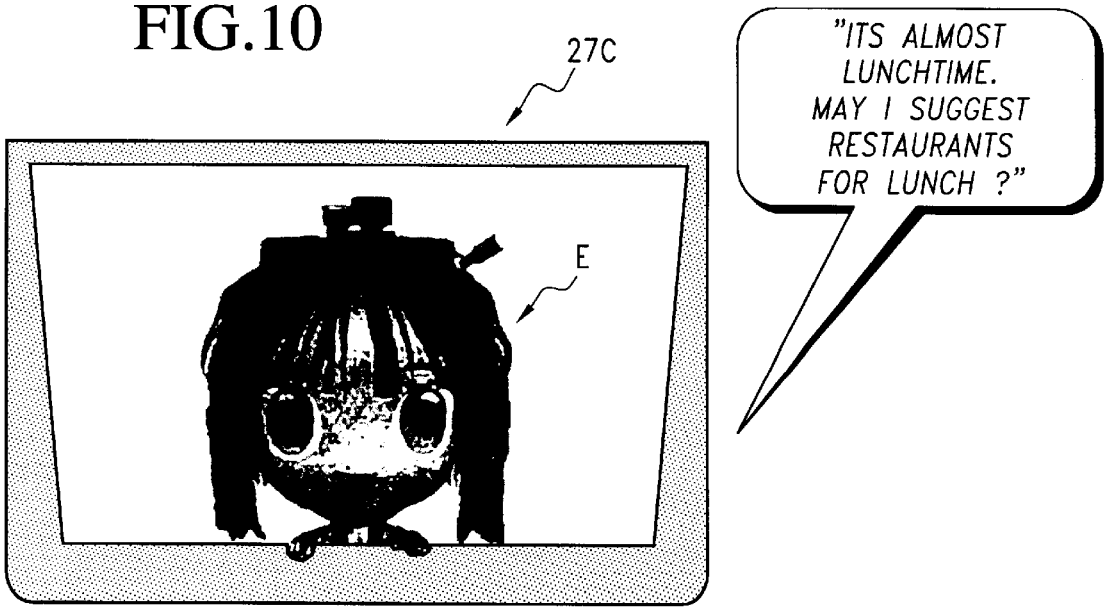
FIG. 10 shows a display picture that illustrates an example of the agent's activity.
Figure 11:
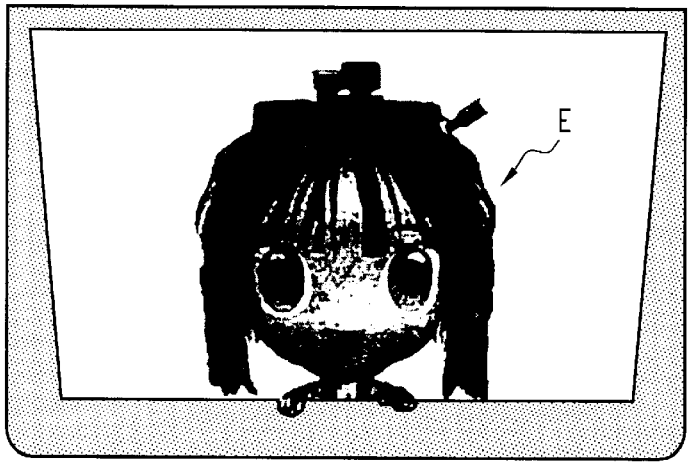
FIG. 11 shows a display picture that illustrates another example of the agent's activity.
Figure 12:
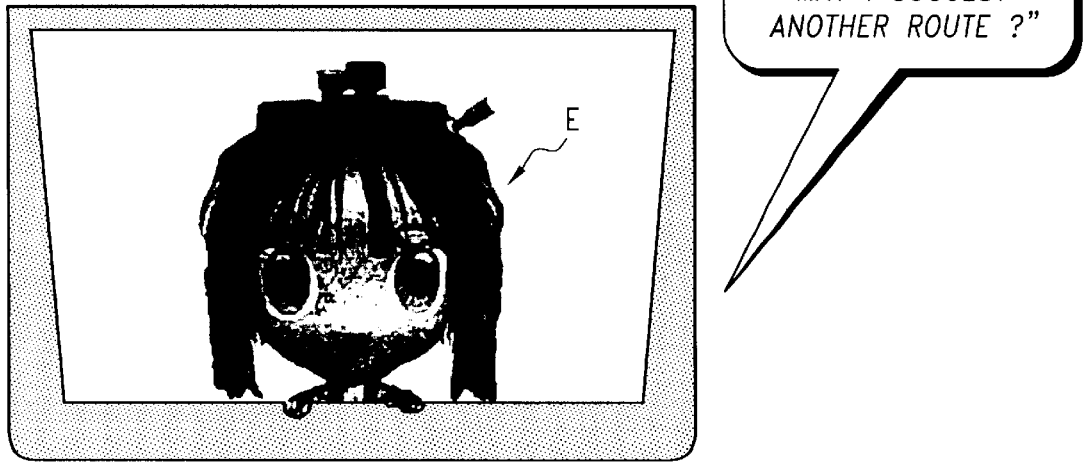
FIG. 12 shows a display picture that illustrates still another example of the agent's activity.

If no event is confirmed in reference to the event selection table 293 (No at S34), the procedure is returned to the main routine. If at least one event is confirmed (Yes at S34), agent processing unit 11 controls the agent activities so that the agent appears on display 27 and asks the user if he wants the event to be actually exercised, at S36. FIG. 10 and FIG. 11 show examples of the picture on which the agent E appears with confirmative questions. A given combination of the image data 29 determines the face and figure of the agent, whereas a given combination of the sound data 292 determines the confirmative question spoken by the agent. The picture 27c of FIG. 10 is applicable when the active event of "invitation to lunch" is confirmed at S34, in which case the agent says "May I suggest restaurants for lunch?", for example. The picture of FIG. 11 is applicable when the active event of "presentation of sightseeing spots" is confirmed at S34, in which case she says "You enter Kyoto City. May I suggest sightseeing spots in Kyoto?", for example. FIG. 12 is another example of the event confirmation picture 27b which is applicable when the event of "by-pass route suggestion" is confirmed at S34. The agent appears on the picture of FIG. 12 and produces a confirmative question to the user, saying "The road seems to be so crowded. May I suggest another route?", in this example.

Then, agent processing unit 11 receives the user's answer to the agent's confirmative question at S38, and determines at S40 if the user's answer is affirmative or negative for execution of the event. When the user does not want execution of the event (No at S40), the procedure is returned to the main routine. In this case, even if some event is confirmed at S34, it is not executed in accordance with the user's intent. Only when the user allows the event to be actually executed (Yes at S40), at S42, agent processing unit 11 controls the agent's activities by which the event confirmed at S34 is actually executed.

Figures 13, 15:
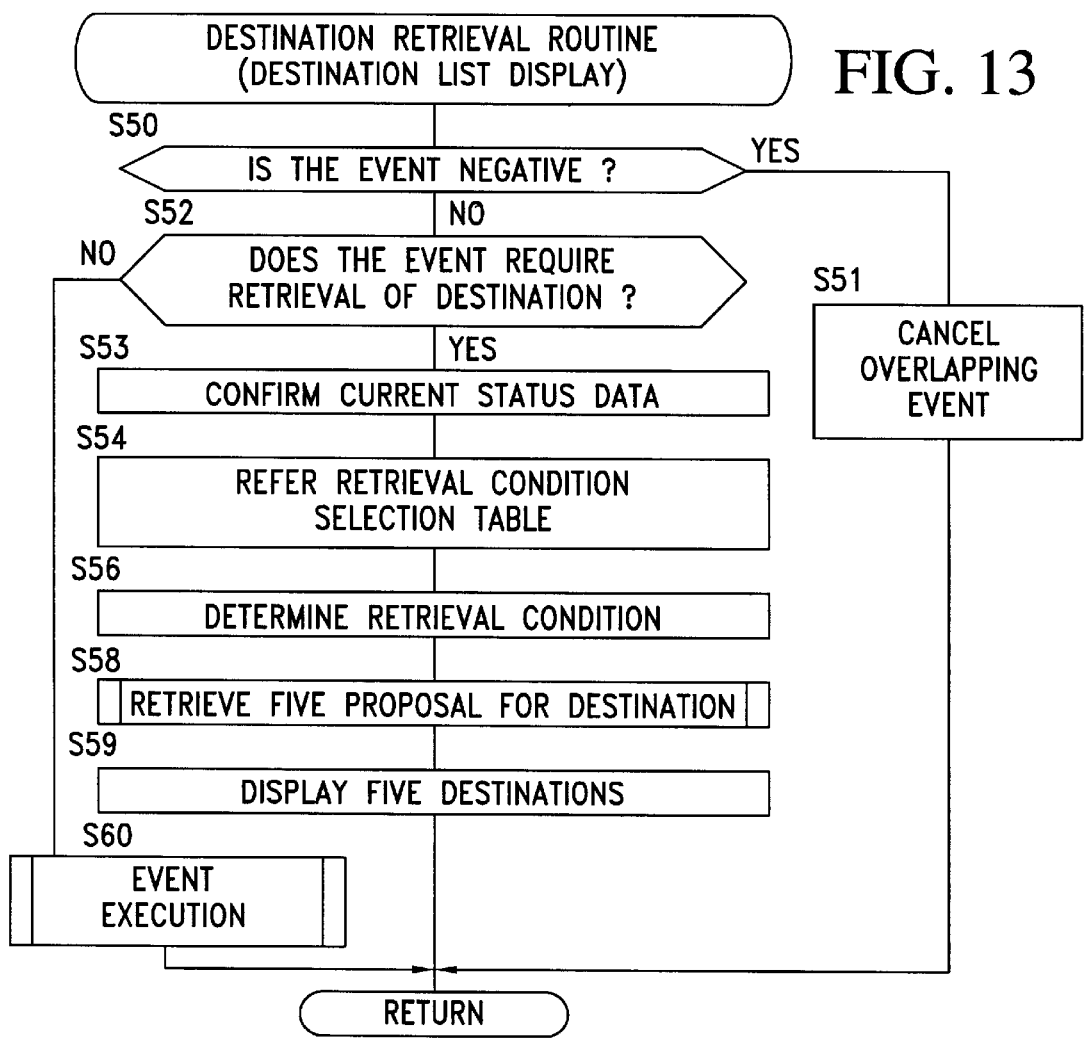
FIG. 13 and FIG. 14 are flowcharts showing the destination retrieval routine.
FIG. 15 is an example of a table with correlation of restaurant groups with application priority points assigned thereto.
Figure 14:
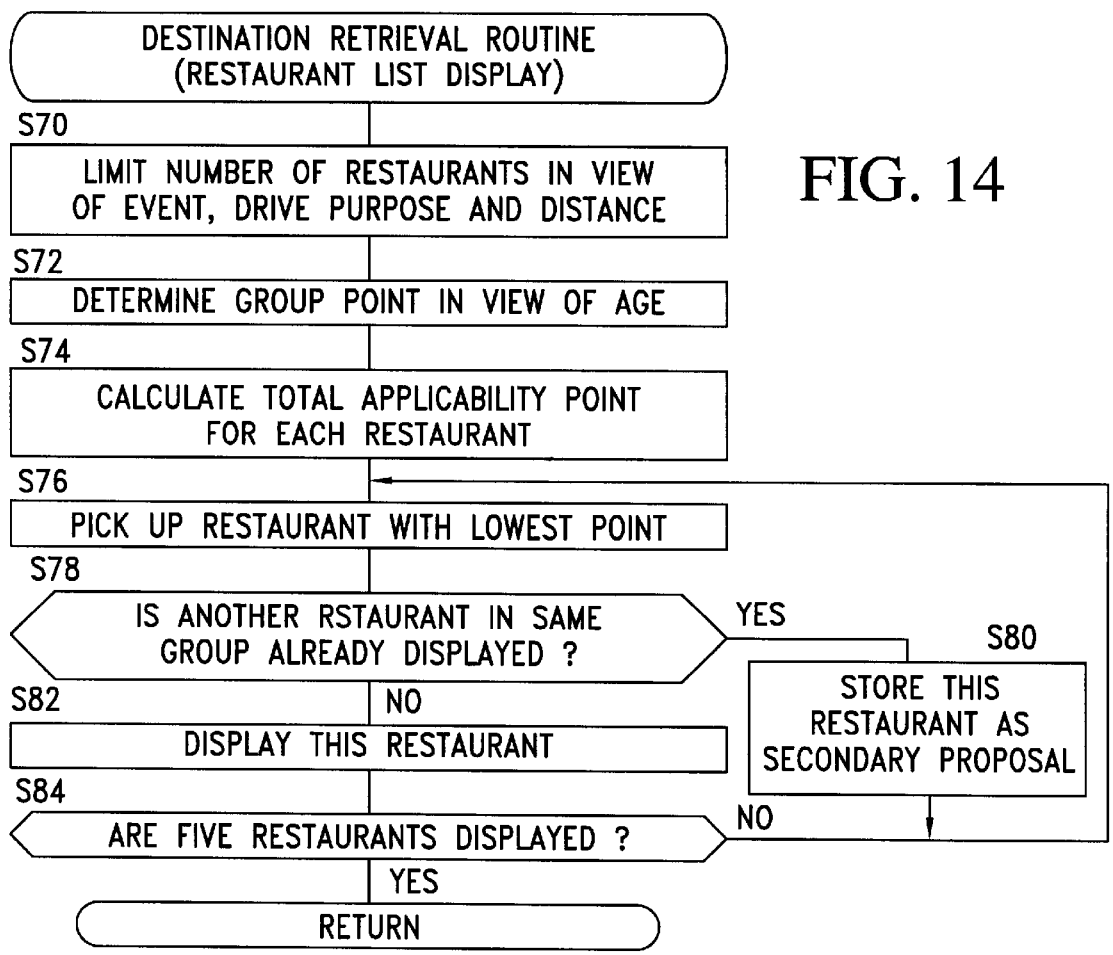
Figure 18:
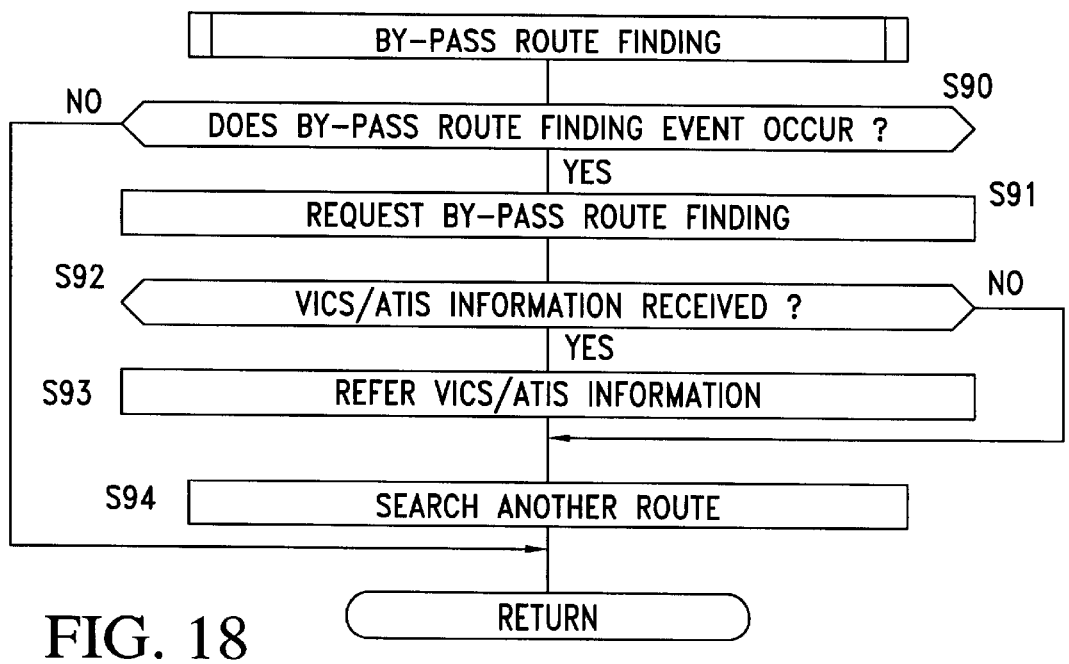
FIG. 18 to FIG. 20 are flowcharts showing the by-pass route finding process.

When it is confirmed that some event should actually be executed at S42 of the flowchart of FIG. 9, agent processing unit 11 then executes the destination retrieval routine in accordance with the flowcharts of FIG. 13 and FIG. 14. First, by reference to the flowchart of FIG. 13, agent processing unit 11 determines at S50 if the event is a negative event. If so (Yes at S50), since the negative event precedes any active or passive event having overlapping content, such active or passive event is cancelled at S51, if any. Then the procedure is returned to the main routine.

When the event is an active or passive event (No at S50), it is then determined at S52 if the event requires retrieval of destination. If destination retrieval is to be done (Yes at S52), agent processing unit 11 proposes one or more spots that might be designated as a destination by the user, through S53, S54, S56 and S58. More particularly, it confirms the current status data including date-and-time-related data (annual event data, seasonal data, monthly data, weekly data, time-of-day related data, etc.), purpose-related data (dating with lover, family shopping, driving alone, with friends, with guests, etc.), location-related data (destination data, current position data, etc.) and user-related data (user's sex and age, etc.), at S53. These items of data may be obtained in the same manner as has been described in conjunction with the flowchart of FIG. 9.

Agent processing unit 11 selects one of predetermined retrieval condition selection tables 294 (FIG. 3) which corresponds the current status data, at S54. By reference to the selected one table 294, it determines one or more conditions for retrieval of destinations, at S56. Such retrieval conditions are stored in RAM. For example, when the event is "invitation to lunch", agent processing unit 11 refers to the restaurant selection table (No. 1 table in FIG. 3) to determine one or more conditions for retrieval of restaurants to be proposed to the user as destinations. Since it is now midday (item No. 3), barbecue restaurants are omitted from a list of proposed destinations. If the inputted drive purpose is dating with lover (item Nos. 6–11), additional retrieval conditions "French is better", "price may be expensive", "at a place of scenic beauty", "quiet", "barbecue restaurants are omitted" and "big-name is better" are also applicable.

By way of another example, when the event-is "presentation of sightseeing spots", agent processing unit 11 refers to the sightseeing-spot selection table (No. 2 table in FIG. 3) to determine the retrieval condition for retrieval of appropriate sightseeing spots around the current vehicle position. A young user may prefer a famous spot, whereas an aged user may prefer a spot where he or she feels relaxed. Such tendencies may be considered in preparing the sightseeing-spot selection table.

Once the retrieval conditions have been determined at S56, agent processing unit 11 retrieves a predetermined number of destinations that meet all of the retrieval conditions from the database 309, at S58. In this embodiment, five destinations are retrieved, and shown on display 27 in the order of priority, at S59.

In this embodiment, restaurants are categorized into Japanese food restaurants, Chinese food restaurants, casual Western-style restaurants, French restaurants, Italian restaurants, Sushi restaurants, noodle restaurants, etc. When the event is to invite the user to a restaurant for breakfast, lunch or dinner, agent processing unit 11 extracts one restaurant from each category. The subroutines to be executed at S58 and S59 will be explained in more detail with reference to the flowchart of FIG. 14.

At S70, agent processing unit 11 retrieves restaurants from the database 309 in accordance with the existing event, the inputted drive purpose, and further in view of a distance (3 km, for example) from the current position. By this, restaurants distant from the current position are excluded. In a modified embodiment, however, this step S70 may be omitted.

Agent processing unit 11 then reads out the user's age from the database 297, with which an application priority point is determined by reference to the correlation table of FIG. 15. This table is stored in the agent data memory 29 and describes group priority points which vary depending upon the restaurant groups and the user's age. A restaurant group with a lower point total is more applicable. For example, a French restaurant group is relatively applicable to a young user (under 40 years old), but is difficult to be picked up when the user is aged (over 40 years old). The user's age may be classified into any desired groups.

At S74, agent processing unit 11 calculates a total applicability point (TAP) of each destination (restaurants in this embodiment), in accordance with the following formula:

TAP=Distance/P+Group/P+Price/P+ . . . +Priority/P+Exclusion/P where Distance/P represents a distance to the restaurant from the current position, which may be increased by one for every 200m distance. Group/P is described in the table of FIG. 15. Price/P reveals if the price level of the restaurant meets the retrieval condition regarding the price. For example, if the retrieval condition described in the restaurant selection table 294 (No. 1 table in FIG. 3) is "Expensive is better", a restaurant having the most expensive price ranking "3" is assigned the Price/P=0, which indicates that said restaurant fully satisfies the retrieval condition regarding the price. Price/P is increased as a difference between the price of the restaurant and the retrieval condition regarding the price.

Priority/P is applied only when the retrieval condition determined by reference to the table 294 includes priority description. For example, when the retrieval condition is "French has the priority" as in item No. 14 in the restaurant selection table of FIG. 3, every French restaurant is assigned Priority/P=−1. When the user-related data in the database 296 includes that he likes Sushi, every Sushi restaurant is assigned Priority/P=−1, as well.

Exclusion/P is applied only when the retrieval condition includes exclusion description. See Nos. 10, 14, 18 and 25 in the restaurant selection table of FIG. 3. In such case, every restaurant that should be excluded from the destination to be proposed to the user is assigned an extremely high Exclusion/P, for example 100 points. This means that the restaurant is very unlikely to be selected as an appropriate destination.

After calculating the total applicability point TAP for each of the restaurants selected at S70, one restaurant having the lowest TAP is chosen at S76. Then, at S78, agent processing unit 11 determines if another restaurant in the same restaurant group as the chosen destination is shown in the current menu picture of display 27. If so (Yes at S78), this restaurant is stored in RAM as a secondary destination at S80, and the procedure is returned to the main routine. If no restaurant in the same group as the chosen restaurant is shown in the current menu picture (No at S78), this restaurant is added to the menu picture at S82. In like manner, five restaurants that are categorized into different groups are listed in the menu picture of display 27, at S84, and the procedure is returned to the main routine.

Figure 16:
FIG. 16 is an example of a display screen by which the user may select a desired one, from the list of restaurants.

In accordance with the flowchart of FIG. 14, the menu picture represents one proposal in each restaurant group, as shown by example in FIG. 16. The menu picture 27d includes a comment column 280, restaurant suggestion columns 281, columns 282 indicating the number of restaurants other than shown in the column 281, an agent presentation area 283 and a cancel key 284. Each column 281 includes the restaurant group, the name, the distance from the current position that is indicated by the length of a bar, and the price ranking that is indicated by the number of coins. In the restaurant selection menu picture of FIG. 16, Japanese restaurant "SAKURA" is shown at the top of the column 281, which means that this restaurant has the lowest TAP among the restaurants selected at S70. The column 282 at the right of "SAKURA"'s column 281 indicates that other two Japanese restaurants are stored in RAM (at S80). When this column is depressed by the user, another Japanese restaurant having the lowest but one TAP is shown at the top column 281.

Figure 17:
FIG. 17 is an example of a display screen showing details of the selected restaurant, by which the user may make a final decision that the restaurant appearing thereon is designated as a destination.
Figure 19:
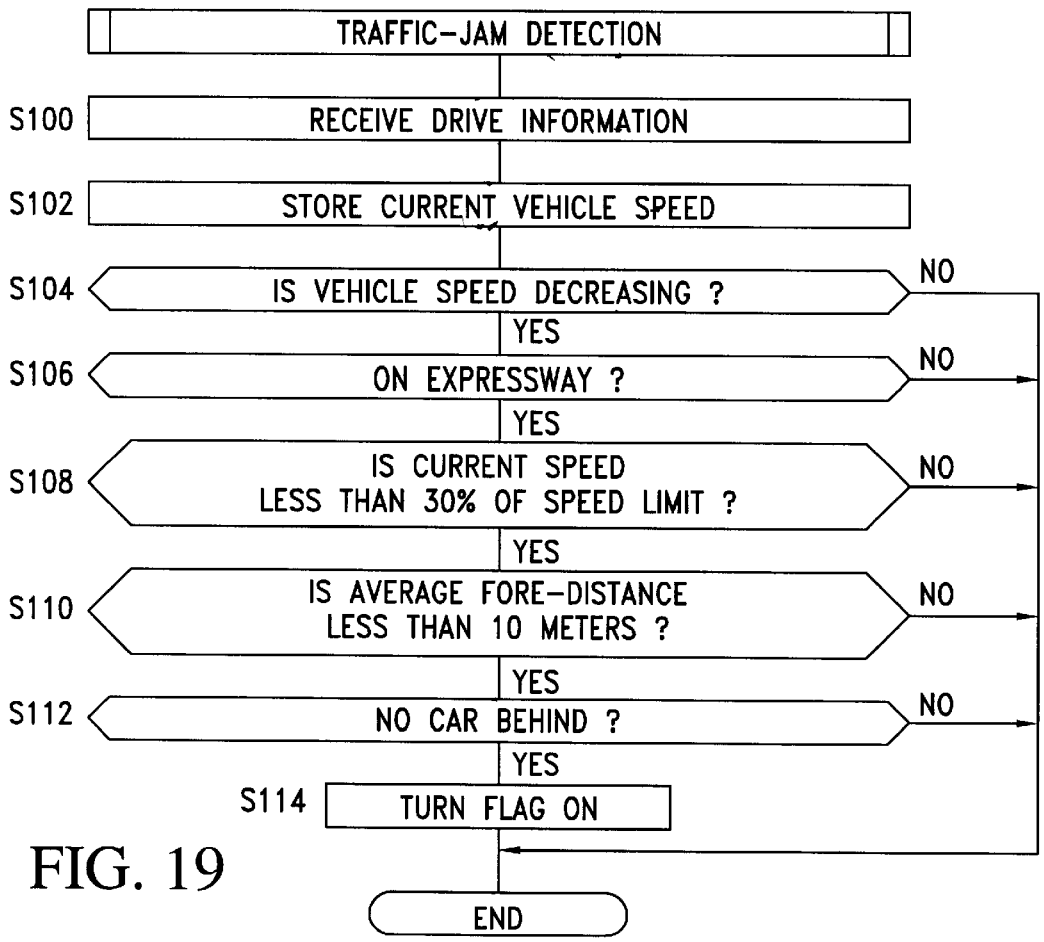

When one of the restaurants appearing in the columns 281 is selected, the picture of the display is changed to a restaurant information picture. FIG. 17 is an example of the restaurant information picture 27e that appears when the Japanese restaurant "SAKURA" is selected on the menu picture 27d of FIG. 16. The restaurant information picture 27e includes a confirmative question describing column 280, a restaurant suggestion column 281a that may be the same as the column 281 of the selected restaurant on the menu picture 27d, a column 282a that may the same as the column 282 of the selected restaurant on the menu picture 27d, an information column 286 providing detailed information for the restaurant. The information may be spoken by the same agent E or another agent (like a commentator) appearing in area 283. A blank area 287 is used to display any image data which may be a map around the restaurant, a photo of a dish, menu or interior decoration.

At the bottom of the restaurant information picture 27e, there is provided a key arrangement including "YES" key 290, "PREVIOUS" key 291, "NEXT" key 292, "BACK" key 293 and "NO" key 294. "YES" key 290 and "NO" key 294 are provided to input the user's answer to the confirmative question described in the column 280, which may be spoken by the agent E. When the user makes a final decision that this restaurant should be designated as a destination, the "YES" key 290 is depressed to send back his affirmative answer. If he wants to have another Japanese restaurant' detailed information, the "NO" key is depressed so that the picture is changed to a menu picture 27d that is substantially the same as that shown in FIG. 16 except that the top column 281 describes another Japanese restaurant having the lowest but one TAP (stored in RAM at S80 in FIG. 14). Operation of "PREVIOUS" key 291 will change the picture to the preceding picture, and operation of "NEXT" key 292 will change the picture to another restaurant information picture 27e on which a detailed information of another Japanese restaurant having the lowest but one TAP now appears. Operation of "BACK" key 293 will change the picture to the menu picture 27d of FIG. 16.

Again, when the "YES" key is depressed, this final decision is supplied to agent processing unit 11 and then to navigation processing unit 10. Navigation processing unit 10 now operates to search for a drive route from the current position to the designated restaurant. If a drive route has been scheduled to a predetermined final destination, navigation processing unit 10 will cancel the scheduled drive route and plan a first drive route from the current position to the designated restaurant and a second drive route from the restaurant to the final destination. In this case, the designated restaurant is not a final destination but a stop point where the vehicle makes a brief stop on the way to the predetermined final destination.

Referring again to the flowchart of FIG. 13, when the selected event does not require the destination to be designated (No at S52), agent processing unit 11 commands that the selected event should soon be executed, at S60. For example, if the event is "by-pass route finding", such event is executed to find another drive route that can by-pass a point of traffic-jam, in accordance with the flowchart of FIG. 18, for example.

Agent processing unit 11 first determines at S90 if there is a "by-pass route finding" event. If not (No at S90), the procedure is returned to the main routine. If such event has been confirmed at S42 of the flowchart of FIG. 9 (Yes at S90), it sends to navigation processing unit 10 a by-pass route finding request signal, at S91. The steps S92–S94 are processed by navigation processing unit 10. It determines at S92 if there is any VICS information received by beacon receiver 215 and/or any ATIS information received through communication control unit 24. If there is any VICS/ATIS information (Yes at S92), navigation processing unit 10 refers to such information at S93 and finds another route to the predetermined destination that can by-pass the crowded road section at S94. The previous drive route that has already been stored in the data file 306 is renewed by the by-pass route that is determined at S94, and the procedure is returned to the main routine.

The traffic jam condition may be detected by traffic-jam detecting unit 16. Detection of the traffic jam condition may be done in any way. For example, the results of detection by wheel speed sensor 402 and distance sensors 420, 421 are used in combination to find a possibility of the traffic jam on a particular road section, in accordance with the flowchart of FIG. 19.

Traffic-jam detecting unit 16 receives drive information such as the road currently traveled and the regulated speed limit, at S100, and also receives the current vehicle speed from sensor 402, at S102. These data are stored in RAM. It then determines (1) if the vehicle speed is decreasing, at S104; (2) if the road currently traveled is an expressway, at S106; (3) if the current vehicle speed is less than 30% of the regulated speed limit, at S108; (4) if the average distance to the car ahead is less than 10 meters, at S110; and (5) if there is no car behind, at S112. These five conditions are determined in accordance with the information previously stored in RAM and the results of detection from sensors 402, 420 and 421. If all conditions are satisfied (Yes at S104, S106, S108, S110 and S112), traffic-jam detection unit 16 judges that the vehicle has been caught in a traffic jam, and therefore turns a traffic-jam indicating flag 161 on, at S114. By this, the by-pass route finding event is confirmed at S42 of the flowchart of FIG. 9.

Figure 20:
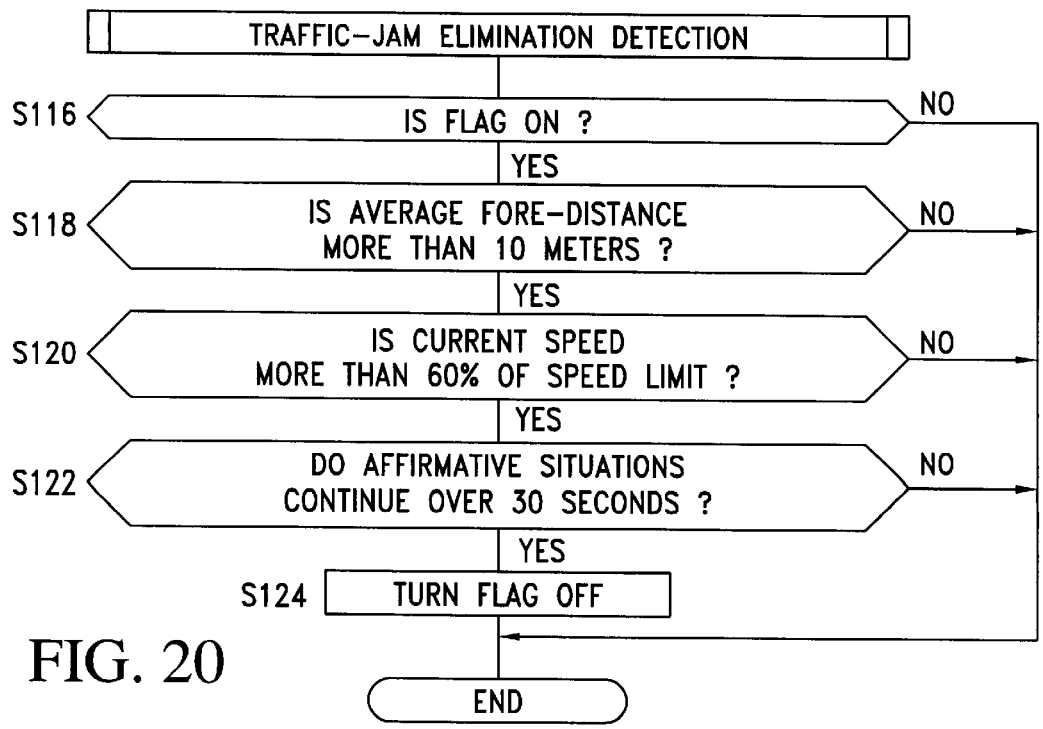
Figure 21:
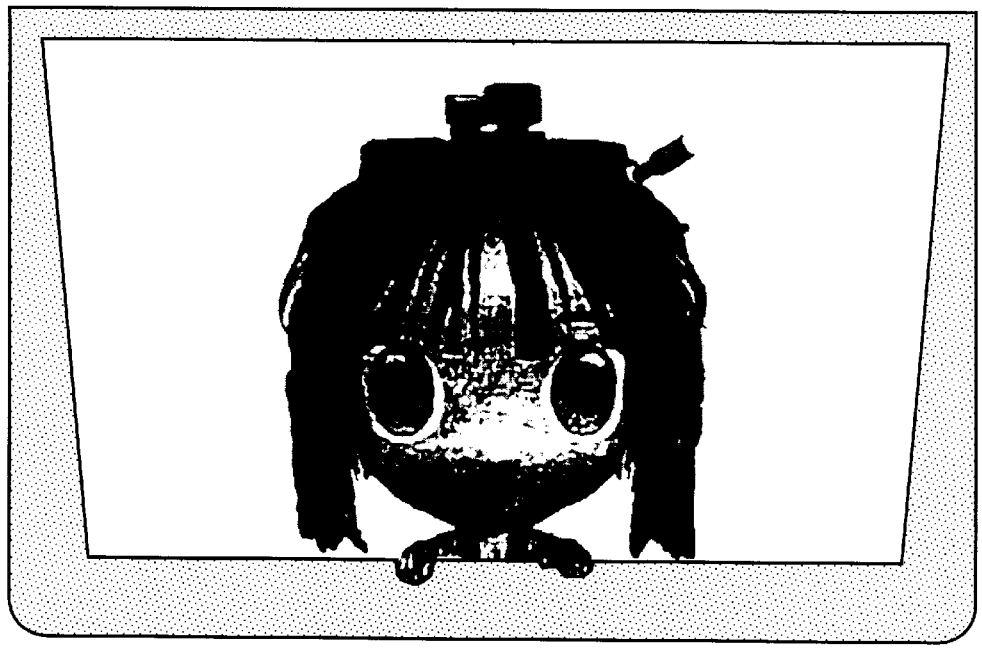
FIG. 21 and FIG. 22 show variations of the agent's figure appearing on the display in particular situations.

The flowchart of FIG. 20 illustrates how to detect that the traffic jam condition has disappeared. Traffic-jam detection unit 16 confirms at S116 that the traffic-jam indicating flag 161 is ON, and then determines (6) if the average distance to the car ahead is more than 10 meters, at S118; (7) if the current vehicle speed is more than 60% of the regulated speed limit, at S120; and (8) if the affirmative conditions at S18 and S120 continue over 30 seconds, at S122. If all conditions are satisfied (Yes at S118, S120 and S122), traffic-jam detection unit 16 judges that the traffic jam condition has disappeared or that the vehicle is no longer in the crowded road section, and therefore turns the flag 161 off, at S124.

Although the present invention has been described in relation to specific embodiments thereof, it should be understood by a man skilled in the art that many modifications and variations may be made without departing from the scope and spirit of the invention as defined in the appended claims.

The agent appearing in the vehicle makes good communication with the user. The agent provides an "event" that suits the user's tastes, favorites and the purpose of drive. The agent also assists the user to select a restaurant, sightseeing spots, etc. where he wants to go or make a stop on the way to the final destination.

The user may enjoy communication with the agent and, therefore, may be prevented from becoming bored, even when driving alone.

The agent may grow with time. For example, the hair of the agent may grow with time. When the hair grows to a predetermined length (FIG. 21), she may ask the user if the hair should be cut. In response to the user's answer that requests a hair cut, she says "OK. I go to a beauty salon." and disappears from the picture. Two hours later, she again appears on the display with a short-cut hair style. Through such communication, the user may make himself more familiar with the agent. When the familiarity has been increased to a predetermined level, she may cut her hair without asking the user. The familiarity level may be increased with the number and period of communication between the user and the agent. The familiarity level may also be increased with the number of the user's affirmative answers to the agent's questions.

Figure 22:
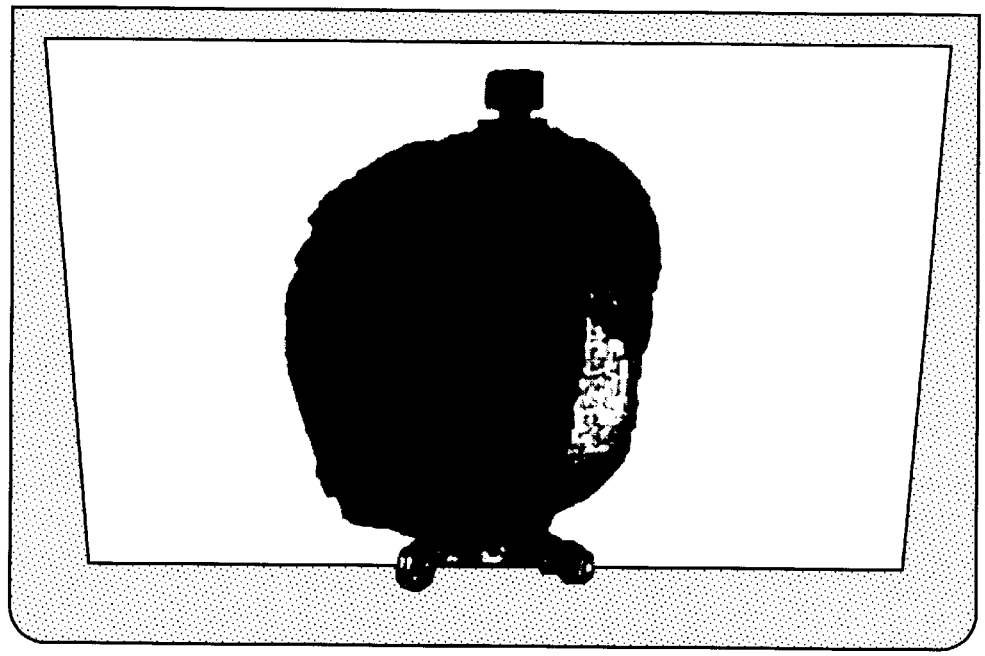

The agent usually looks straight ahead but may look the other way in a particular situation. For example, when the agent looks straight ahead, it means that sound recognizor 142 may accept voice input by the user through microphone 25, whereas it may not accept the voice input when the agent looks the other way as shown in FIG. 22. This is an example in which a change in appearance, face and figure of the agent reflects a different status of the system that should be known to the user.

In the illustrated embodiments, the event selection table 293 (FIG. 2) and the retrieval condition selection table 294 (FIG. 3) are stored in the agent database memory 29. In a modification, these tables may be located in a database center communicatable with processing unit 1 via communication control unit 24. In this modification, agent processing unit 11 sends the current status data (confirmed at S30 of the flowchart of FIG. 9) to the database center via communication control unit 24. The database center determines one or more specific events by reference to the event selection table 293 and then determines the retrieval conditions by reference to the retrieval condition selection table 294, both of which are then supplied to agent processing unit 11. The database center operates in accordance with the flowchart of FIG. 9, and also in accordance with a part (S53–S56) of the flowchart of FIG. 13.

The database center may further store a destination database that has substantially the same contents as the destination database 309 in memory 309. In this case, the database center may operate in accordance with the flowcharts of FIG. 9 and FIG. 13 to propose a list of destination suggestions, which is supplied to agent processing unit 11.

What we claim is:

1. A device for assisting designation of a specific destination in use of a vehicle navigation system that guides a user along a drive route from a current position of a vehicle detected by a current position sensor to a designated destination, comprising:

destination storing means for storing destination data;

date-and-time sensor means mounted in the vehicle for detecting current date and time;

drive purpose acquiring means for acquiring the user's purpose of drive;

user-related data storing means for storing user-related data;

retrieval condition determining means for determining a specific combination of retrieval conditions applicable to retrieval of destinations, with reference to the current date and time detected by said date-and-time sensor means, the user's purpose of drive acquired by said drive purpose acquiring means and the user-related data stored in said user-related data storing means;

destination candidate selection means for retrieving, from the destination data stored in said destination storing means, destinations that satisfy the specific combination of retrieval conditions determined by said retrieval condition determining means;

output means for outputting the retrieved destinations; and final destination selection means for allowing the user to select at least one of the retrieved destinations.

2. The device according to claim 1 further comprising vehicle-related data acquiring means for acquiring vehicle-related data, said retrieval condition determining means determining said specific combination of retrieval conditions with reference to the vehicle-related data acquired by said vehicle-related data acquiring means, in addition to the current date and time, the user's purpose of drive and the user-related data.

3. The device according to claim 1 wherein said retrieval condition determining means determines the specific combination of retrieval conditions with reference to the current position of the vehicle detected by the current position sensor, in addition to the current date and time, the user's purpose of drive and the user-related data.

4. The device according to claim 1 wherein said destination candidate selection means selects candidates for the destination with reference to price ranks of restaurants included in said destination data.

5. The device according to claim 4 wherein said output means comprises a display on which said retrieved destinations are displayed together with said price ranks of the retrieved restaurants.

6. The device according to claim 1 further comprising a data table correlating user's ages included in the user-related data with restaurant groups stored in said destination storing means as the destinations, wherein restaurants are classified in said restaurant groups in accordance with the types of foods served therein, said destination candidate selection means selecting candidates for the destination with reference to said data table.

7. The device according to claim 1 wherein said output means includes display means for displaying the retrieved destinations output by said output means and further comprising vehicle-related data acquiring means for acquiring vehicle-related data; and control means for controlling activities of a personified agent appearing on said display means, with reference to the user-related data stored in said user-related data storing means and the vehicle-related data acquired by said vehicle-related data acquiring means.

8. The device according to claim 7 wherein said control means controls the activities of said personified agent to act as a part of said drive purpose acquiring means for acquiring the user's purpose of drive.

* * * * *